Inventors:
Frederick P. Netznik,
Patrick J. McCauley,
By Brown, Jackson, Boettcher & Diemer
Attys

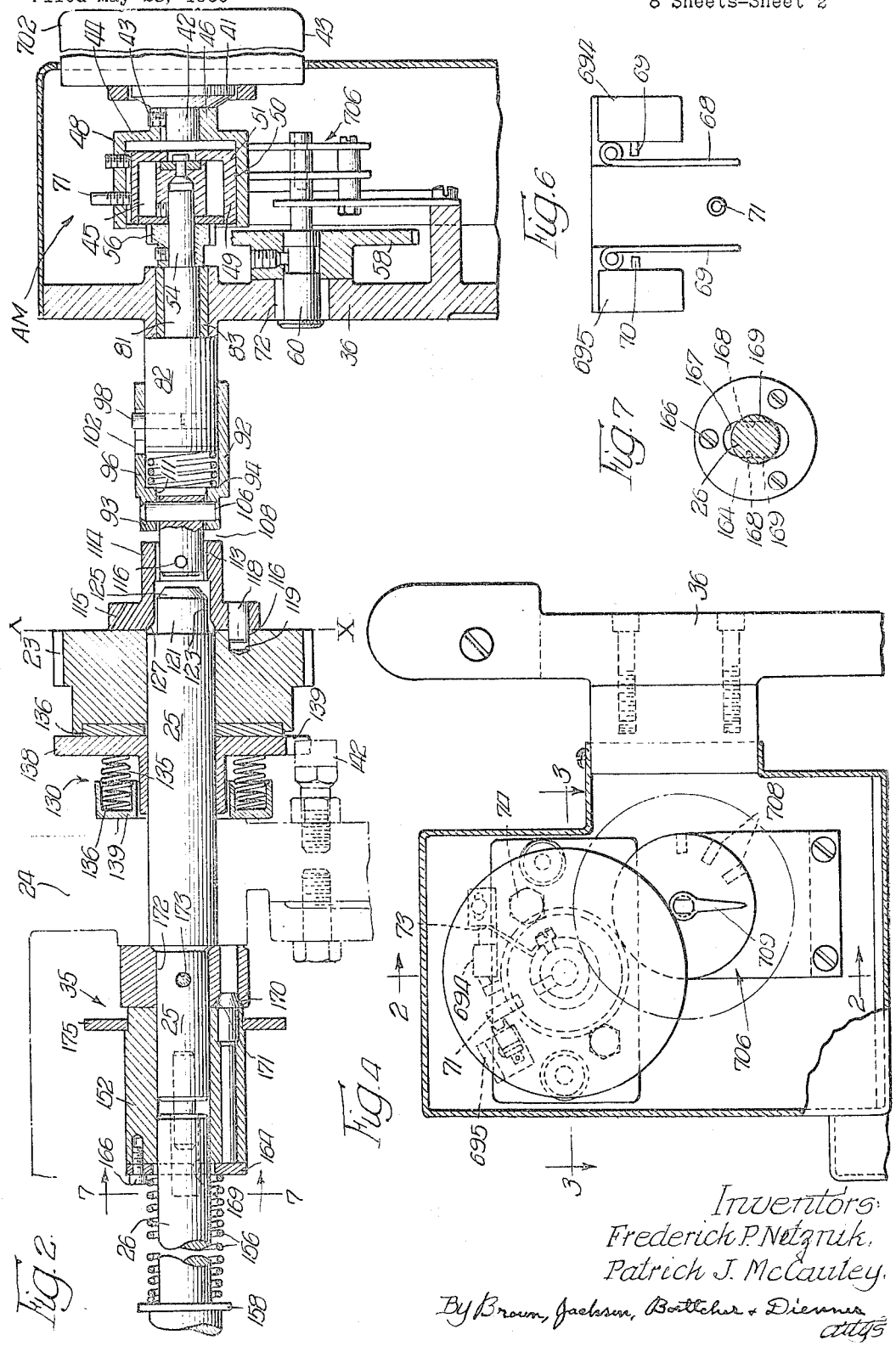

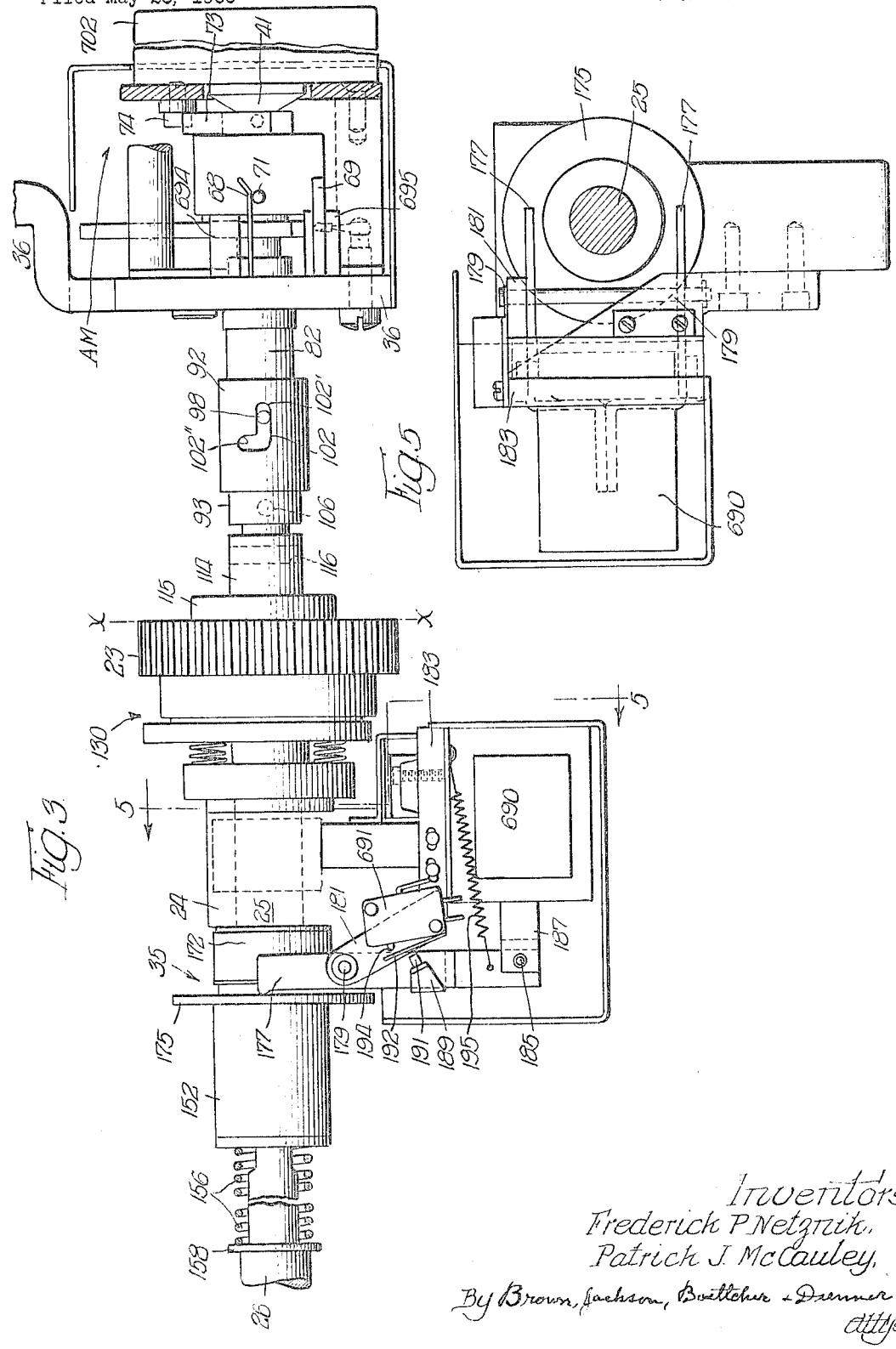

INVENTORS.
Frederick P. Netznik
Patrick J. McCauley
BY *Brown Jackson Boettcher & Dienner*
ATTYS.

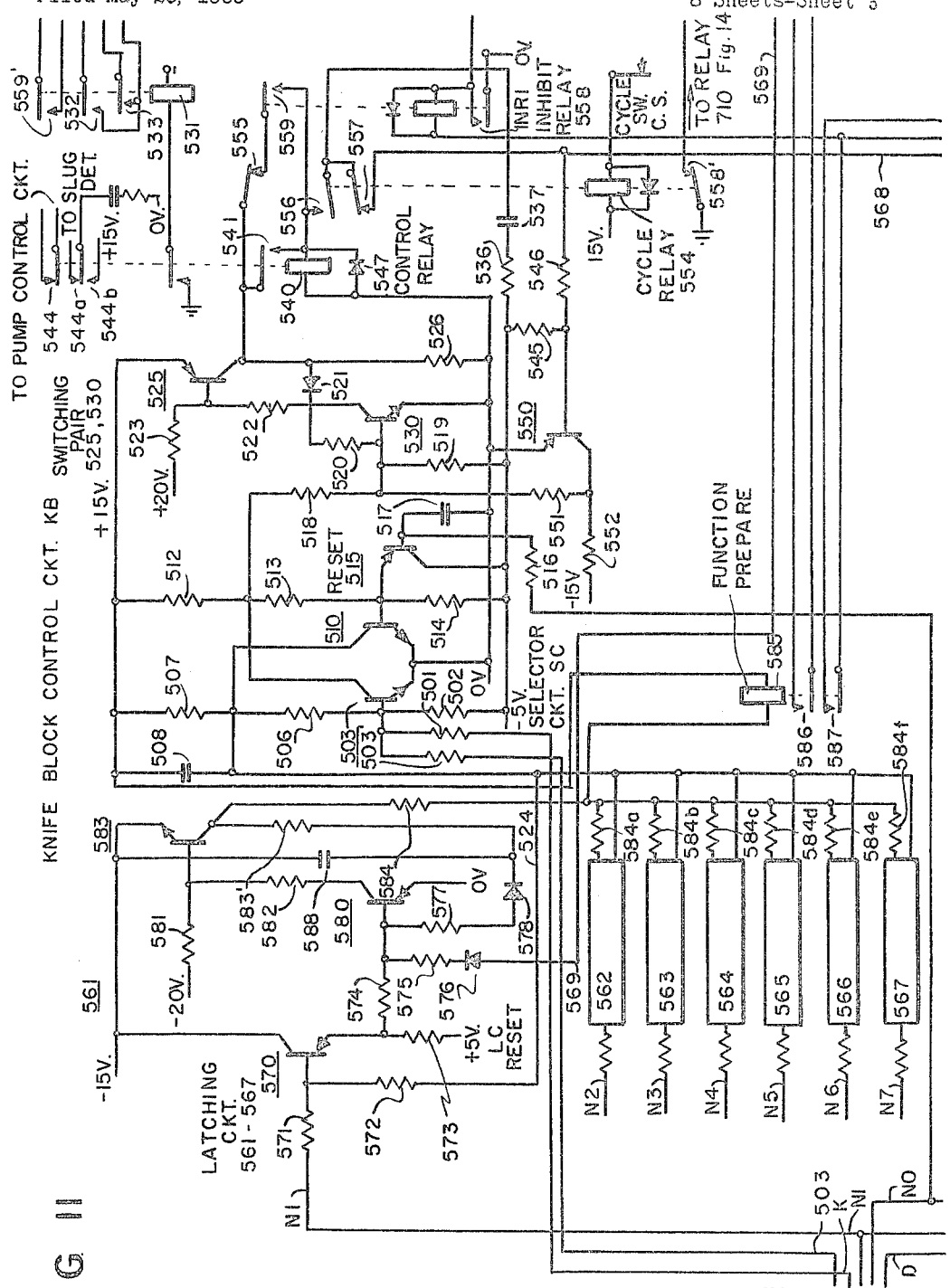

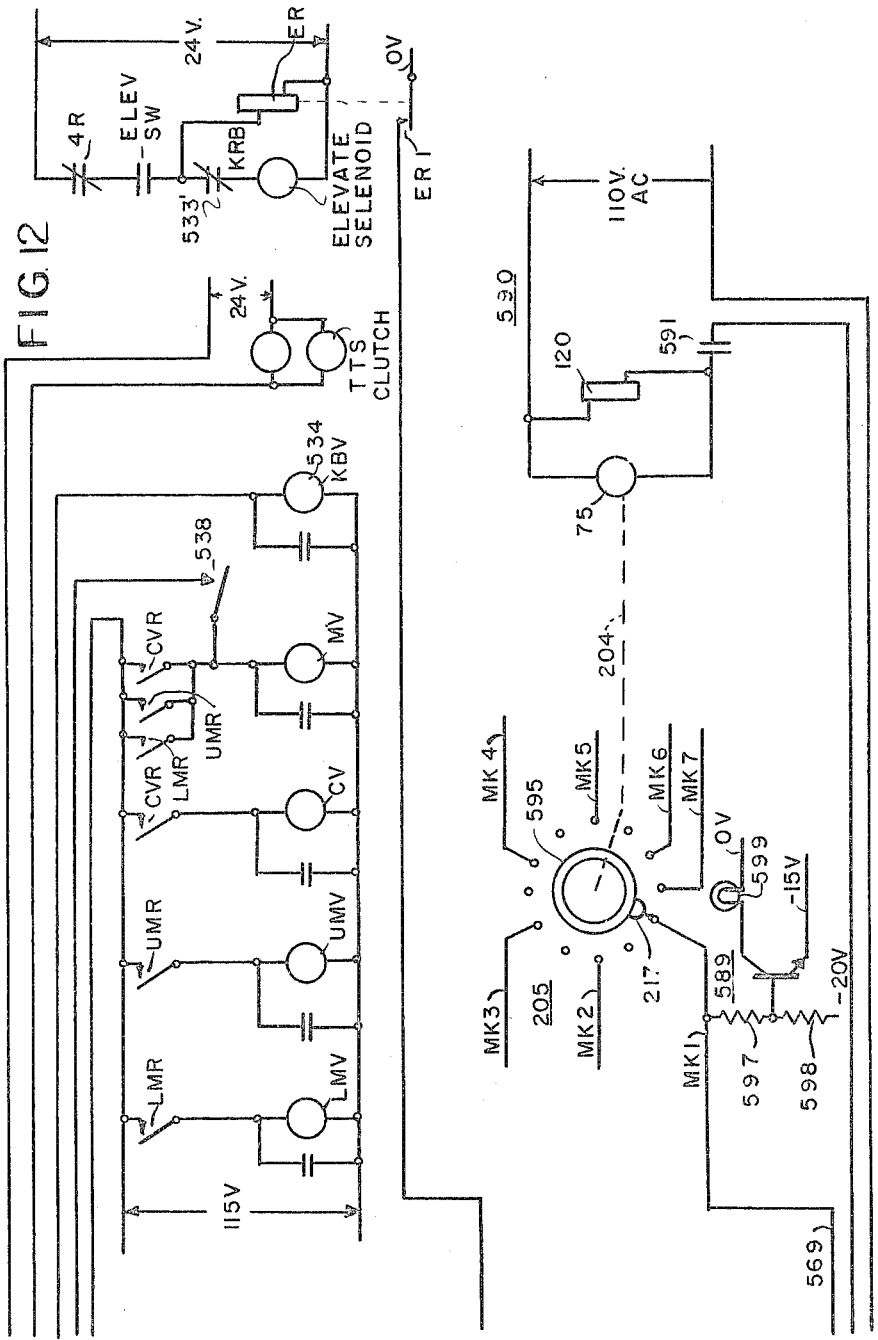

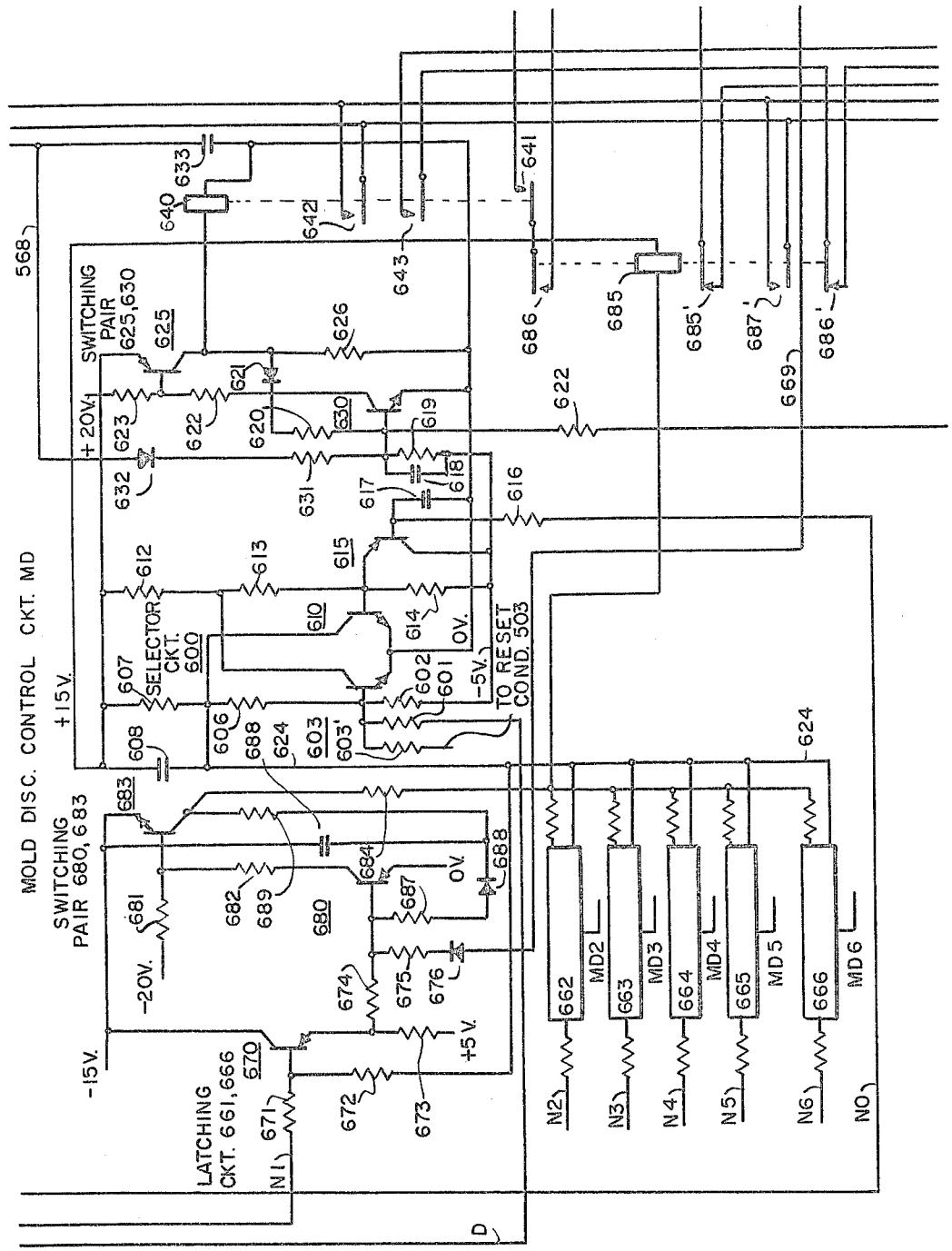

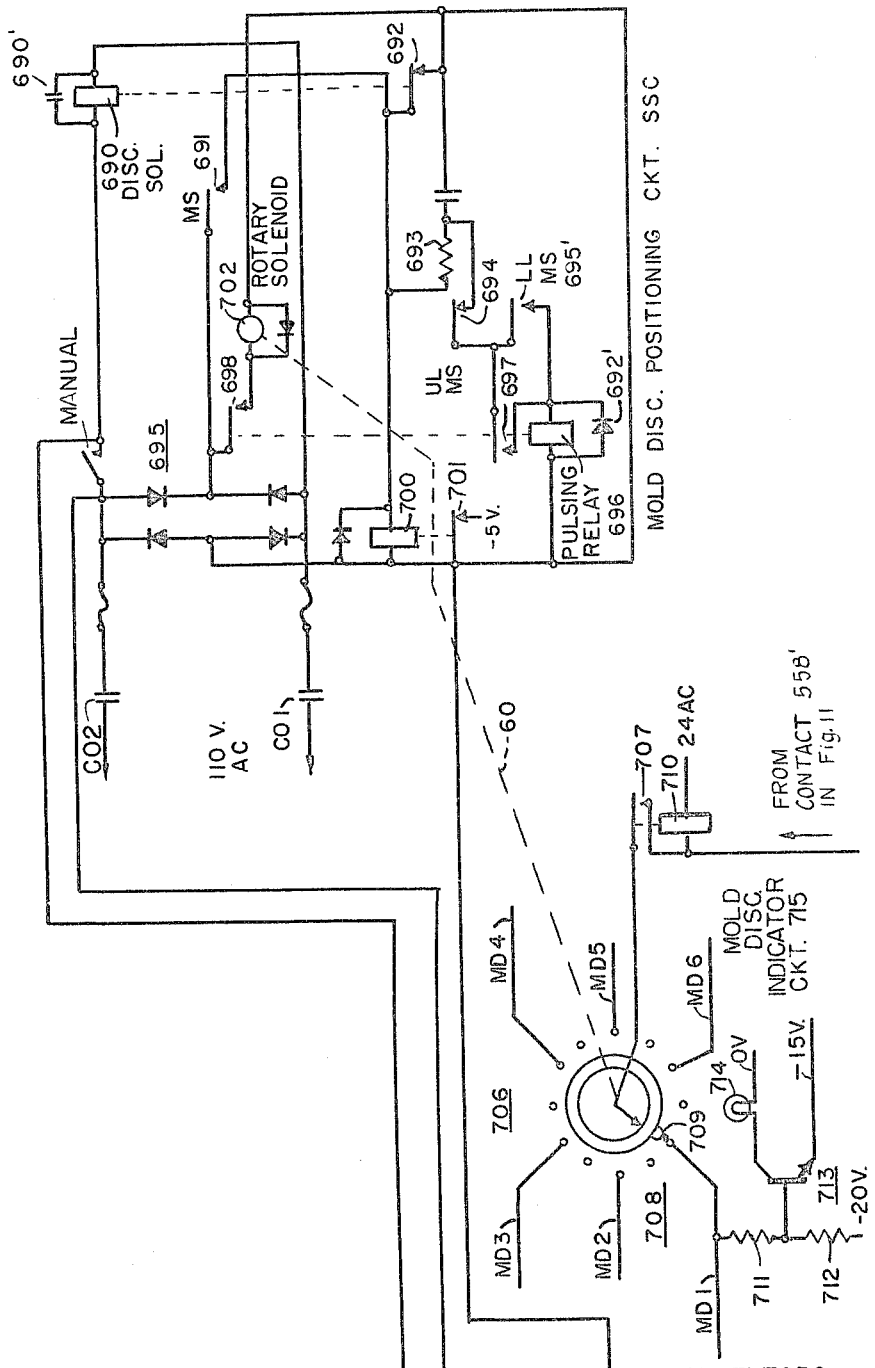

United States Patent Office 3,291,290
Patented Dec. 13, 1966

3,291,290
AUTOMATIC MOLD DISK CONTROL MECHANISM FOR LINECASTING MACHINES
Frederick P. Netznik, Skokie, and Patrick J. McCauley, Glenview, Ill., assignors to Mohr Lino-Saw Company, Skokie, Ill., a corporation of Illinois
Filed May 28, 1965, Ser. No. 459,792
26 Claims. (Cl. 199—48)

The present invention relates to an improved automatic mold disk control mechanism for linecasting machines. More specifically, the general object of the invention is to provide automatic control mechanism which will rotate the mold disk for performing a mold selecting or mold substituting operation; as, for example, to pick out a mold producing a thicker or thinner slug, or a shorter or longer slug, etc. This mold selecting or substituting operation is disclosed in the present application as being performed under coded tape control, although the invention in its broader aspects is not necessarily limited to coded tape control.

The present invention has been developed as an improved extension of the automatic control system disclosed in the co-pending application of Frederick P. Netznik and Joseph Gardberg, Serial No. 407,200, filed October 28, 1964, on "Automatic Control Mechanism for Linecasting Machines." In that application, coded tape is utilized to control a typesetting operation as a main function, and also to control a slug sawing operation as a secondary function. The coded tape is passed through a tape reader and the signal data from such tape reader operates through translating apparatus to perform the typesetting operation and the slug sawing operation. The mold disk control mechanism disclosed in the present application can be combined with the system of the co-pending application to add the mold selecting operation as a further secondary function beyond the secondary function of the slug sawing operation. However, it is to be understood that the present invention is not limited to being combined with the system of the co-pending application, and that it may utilize any different form of tape reader and any different form of translating apparatus than are disclosed in said co-pending application.

It is standard practice in the conventional linecasting machine, such as the Linotype and the Intertype, to revolve the mold disk by a well-known mechanical drive arrangement. In this mechanical drive, a cam shaft extending across the rear of the machine carries a short segment beveled gear and a long segment beveled gear which intermittently mesh with a beveled pinion that is connected to a drive shaft extending forwardly along the side of the machine. The front end of this drive shaft carries a mold disk driving pinion which meshes with a ring gear encircling the mold disk. This is the conventional mechanical drive arrangement that revolves the mold disk in its cyclical movement between slug casting and slug ejecting positions.

The present invention combines with this mechanical drive arrangement an electrical drive arrangement in which an electric motor is utilized to rotate the mold disk for performing the above mold selecting or substituting operation. This electrical drive is initiated and controlled by signals transmitted from the coded tape.

One of the objects of the invention is to provide improved mold disk control mechanism which will automatically effect the transposition of the mold disk control from the mechanical drive to the electrical drive and vice versa, as the signals from the tape dictate.

Another object of the invention is to provide improved mold disk control mechanism which will automatically rotate the mold disk the required amount to bring the newly selected mold into operative position, pursuant to signals from the coded tape.

Another object of the invention is to provide improved mold disk control mechanism utilizing a unique relation of over-running clutch to isolate the electrical drive from the mechanical drive when the mechanical drive has assumed control of the mold disk operation.

The electrical drive mechanism is mounted on the hinged vise frame of the machine, and another object is to provide a unique relation of coupling for automatically disconnecting and reconnecting the electrical drive mechanism with respect to the mold disk when the vise frame is swung between its open and closed positions.

Another object is to provide improved circuitry and associated means for operating through the above electrical drive arrangement to cause the selective rotation of the mold disk in the operation of selecting a different mold.

Other objects, features and advantages of the invention will appear from the following detailed descriptions of one preferred embodiment thereof. In the accompanying drawings illustrating such embodiment:

FIGURE 2 is a vertical sectional view illustrating the drive connections, corresponding to a section taken approximately on the plane of the line 2—2 of FIG. 4.

FIGURE 3 is a horizontal sectional view through the drive connections, taken approximately on the plane of the line 3—3 of FIG. 4.

FIGURE 4 is a front view of the electric motor drive mechanism.

FIGURE 5 is a transverse sectional view taken approximately on the plane of the line 5—5 of FIGURE 3.

FIGURE 6 is a detailed view of the high limit and low limit switches controlling the electric motor.

FIGURE 7 is a detailed sectional view taken approximately on the plane of the line 7—7 of FIGURE 2.

FIGURES 10 to 15 inclusive set forth the control circuits for the mold disk and knife block equipment.

Figure 1:
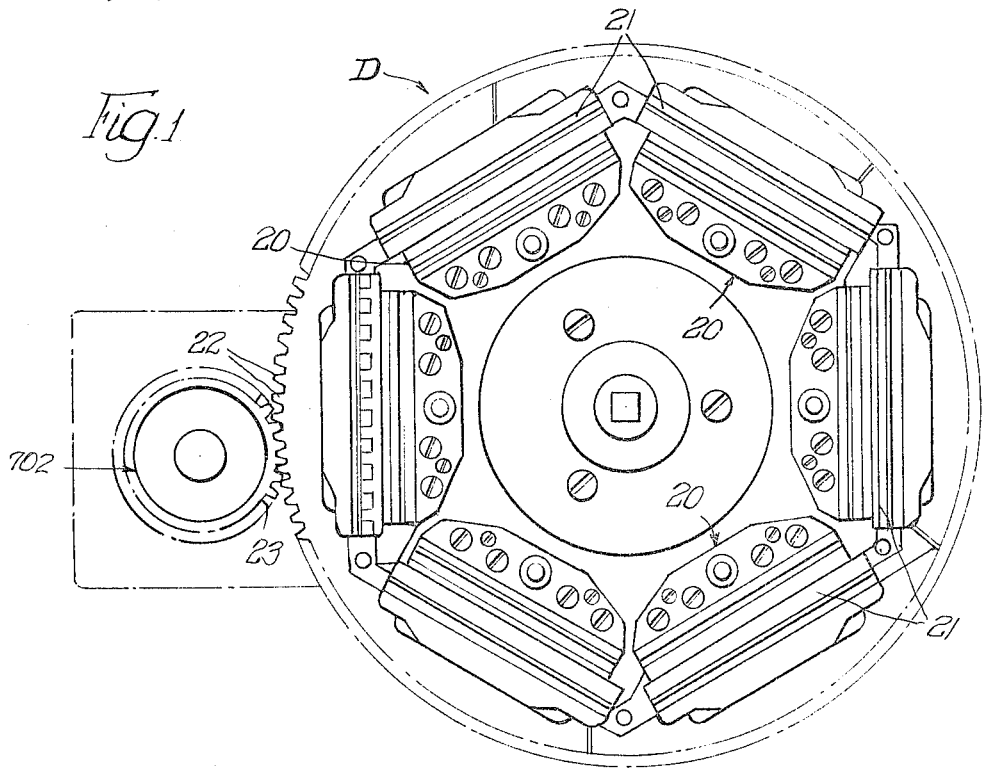
FIGURE 1 is a schematic front view of a conventional mold disk, showing the electrical drive mechanism coupled thereto.

Referring first to FIGURE 1, a conventional mold disk is indicated schematically at D, having conventional mold pockets 20 formed therein, in which pockets are mounted the molds 21. The mold disk shown is of the six pocket type for accommodating six molds. The mold pocket which occupies the vertical position on the right hand side of the mold disk is in the slug ejecting position, in which position the slug is ejected from the mold into the knife block. This position is also the normal or functional position of the one of the molds selected for use. Following the ejection of the type slug from the mold in this position, the mold stands in this normal position in readiness to start a new cycle. The first step in the new cycle is the revolution of the mold through 90° into an uppermost horizontal position, which is the casting position where the molten type metal is forced into the mold to form the new type slug. Thereupon the mold disk is revolved through 270° to return the mold into the original slug ejecting position, where the new slug is ejected. The mold now stands in the normal position, in readiness to start a new cycle. The mold pocket 20 usually have mounted therein different molds of different dimensions or types for producting type slugs having different widths, different lengths, overhung characters, etc. Whenever it is desired to produce a type slug from one of the other molds, the mold disk is revolved to present this different mold into the right hand vertical or functional position, this being in response to the transmission of appropriate code signals from the perforated tape.

Figure 8:
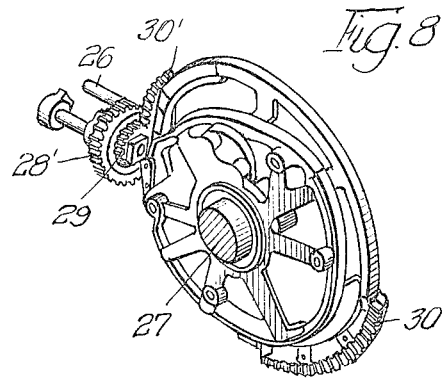
FIGURE 8 is a schematic view illustrating the driving connection between the rear cam shaft and the forwardly extending mold disk driving shaft.
Figure 9:
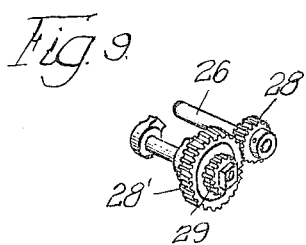
FIGURE 9 is a fragmentary view showing part of FIGURE 8.

Cut in the periphery of this mold disk D is a ring gear 22 with which meshes a mold disk driving pinion 23 mounted upon a pinion drive shaft 25 which is suitably journaled in the frame 24 of the linecasting machine. During all normal operations of the linecasting machine, when the mold disk D is functioning during the normal operations of casting and ejecting the slugs, the drive shaft 25 and pinion 23 are adapted to be driven from a co-extensive rear drive shaft 26 that extends rearwardly to the mold disk cam shaft 27 extending across the back of the machine (see FIGURE 8). Here the rear drive shaft 26 is driven from the cam shaft 27 through spur gears 28, 28' and a bevel pinion 29 which is driven intermittently by long and short bevel gear segments 30, 30' rotating with the cam shaft 27. This gearing transmits the different advancing movements to the molds, such as into the casting position and into the ejecting position, all of which is old and well-known in the art. The cam shaft 27 transmits a unidirectional drive to the mold disk pinion 23 for always rotating it in a clockwise direction, as viewed in FIGURE 1. In the operation of the mold disk under perforated tape control, the pinion drive shaft 25 and pinion 23 are disconnected from the rear drive shaft 26 through the operation of a disconnect clutch 35, to be later described in detail.

Referring now to the perforated tape control, the mold disk D and pinion 23 are adapted to be automatically rotated under the control of an assembly of automatic operating mechanism, designated AM in its entirety, which extends forwardly of the driving pinion 23. This automatic operating mechanism AM is supported on suitable bracket structure, generally indicated at 36, which is fastened to the conventional vise frame that is pivoted to swing down from the front of the linecasting machine. The automatic operating mechanism comprises an electric motor 702 which may be of any desired type or construction. As illustrative of one construction of motor which may be used, there is herein shown a rotary solenoid motor commercially marketed under the name of "Ledex," and manufactured by Ledex, Inc., of Dayton, Ohio. One such motor is identified as No. S–8215-024. This Ledex motor has a magnetically impelled forward rotary stroke, followed by a spring impelled return rotary stroke, the return stroke being caused by a spirally wound torque spring 41 having its outer end anchored to the motor housing and its inner end anchored to the motor shaft 42. Fastened to this shaft by a set screw 43 is a cup shaped housing 44 and mounted within this housing is a suitable type of over-running or freewheeling clutch 45, typically represented by a so-called Morse cam clutch (identified as a B–203 Morse cam clutch manufactured by Morse Chain Co., of Elk Grove, Illinois), which is operative to transmit the power driving impulses from the rotary solenoid 702. In the embodiment herein disclosed, the rotary solenoid 702 and over-running clutch 45 result in the transmission of a forwardly progressing ratcheting motion in a clockwise direction, as viewed from the front (FIG. 1). This motion is transmitted from the clutch through an output shaft 54 to which is secured a pinion gear 56. The latter meshes with a large gear 58 fixedly mounted on a stub shaft 60, latter being rotatably journaled in the frame bracket 36 which is fastened to the hinged vise frame of the linecasting machine. Mounted on this stub shaft 60 is a rotary switch 706 (FIG. 4) comprising a ring of stationary contacts 708 within which revolves a rotating wiper contact 709 secured to the stub shaft 60. The rotary switch 706 is connected in the electrical circuitry to cooperate in indexing the range of stepping movements of the rotary solenoid for advancing the mold disk to present the different mold cavities into casting position, as will hereinafter appear from the circuitry description.

Also associated with the rotary solenoid are an upper limit electrical switch 694 and a lower limit electrical switch 695. Referring to FIG. 6, the upper limit electrical switch 694 is actuated by a pivotally swinging operating arm 68, actuating switch plunger 69, and the lower switch 695 is operated by a pivotally swinging operating arm 69', actuating switch plunger 70. Between the swinging extremities of these operating arms oscillates an actuator screw 71 which actuates these operating arms at the upper and lower limits of movement of the rotary solenoid. This screw 71 also passes down through the cup shaped housing 43 for anchoring the housing of the over-running clutch 45 therein. These high and low limit switches cooperate in controlling the pulsing of the rotary solenoid, as will be evident from the circuitry portion of the disclosure.

Projecting radially outwardly from the hub 44' of the cup-shaped housing 44 is a flexing leaf form of stop spring 73 which is adapted to strike against a stop projection 74 secured to the end of the motor 40. This leaf spring is adapted to strike against the projection 74 when the clutch housing 44 has been oscillated clockwise to the end limit of its energized oscillation, this leaf spring reacting to give additional spring impetus to the clutch housing to return it to its counterclockwise end position.

The output shaft 54 leading from the ratchet clutch has successively enlarged portions 81 and 82, the portion 81 being journaled in a sleeve bearing 83 mounted in the frame bracket 36. Slidably mounted over the enlarged shaft portion 82 is a sleeve 92 having a reduced end portion 93 which forms an internal shoulder 94. Confined between this internal shoulder and the end of the shaft portion 82 is a compression spring 96 which normally tends to slide the sleeve 92 rearwardly along the shaft. Anchored in the shaft is a transverse pin 98 which enters a slot 102 formed in the sleeve. As shown in FIG. 3, this slot 102 has a longitudinal portion 102' and a right angle offset portion 102". When the longitudinal portion 102' is engaging over the pin, the sleeve can be pulled endwise against the pressure of the spring 96 to bring the offset portion 102" into registration with the pin, whereupon the sleeve can be rotated to engage the offset portion over the pin to hold the sleeve 92 in this retracted position.

Extending transversely through the reduced end 93 of the sleeve is a coupling pin 106 which passes through the front end of a short coupling shaft 108. The bore 111 of the reduced end 93 is slightly larger than the coupling shaft 108, whereby the coupling shaft 108 can swivel slightly around the pin 106 within this bore. The front end of the shaft 108 has a similar loose fit within the bore 113 of the hub portion 114 of a coupling member 115. A transverse pin 116 extends through the boss 114 and the end of the shaft 108, this pin 116 extending at right angles to the pin 106. By virtue of the loose fit of the front end of the short coupling shaft 108 within the reduced end 93 of the sleeve 92, and the loose fit between the rear end of the coupling shaft 108 and the hub portion 114, the coupling member 115 has a limited degree of universal joint freedom in its mounting on the rear end of the sleeve 92. The coupling member 115 is adapted to establish releasable coupling engagement with the front face of the mold disk pinion 23 through a readily releasable coupling connection 116 comprising a coupling pin 118 which projects from the member 115 and a coupling hole 119 formed in the front face of the pinion 23 for receiving the pin 118. Extending from the end of the shaft 25 is a stub portion 121 which has a free sliding fit within a bore 123 provided within the coupling member 115. The end of the stub portion 121 has a beveled slope 125, and the bore 123 has a beveled entrance 127 to facilitate the centering of the coupling member 115 with respect to the mold disk pinion 23.

Whenever the vise frame swings outwardly and downwardly into its open position, the above described automatic operating mechanism AM is likewise swung outwardly and downwardly in a direction away from the mold disk pinion 23. It will be seen that the coupling member 115 is capable of ready separation from the mold disk pinion 23 at the coupling connection 116, shown by line of separation designated X—X in FIGS. 2 and 3. As above described, the coupling member 115 has a limited universal joint action by the slight pivoting around the first pin 106 and the slight pivoting around the second pin 116 at right angles thereto, and this enables the coupling member 115 to readily center itself and slide over the stub shaft 121 when the automatic operating mechanism AM is swung back into recoupled position, in the closing of the vise frame. There may be occasions when it is desired to manually uncouple the coupling member 115 from the mold pinion 23, and to temporarily hold it in such uncoupled relation. This is readily accomplished by manually retracting the slidable sleeve 92 in an outward direction to withdraw the pin 118 of the coupling member 115 from the hole 119 in the pinion 23, and then rotating the sleeve 92 to engage the angle portion 102" of the slot over the pin 98, which holds the sleeve 92 in its retracted position.

All rotary movements imparted to the mold disk through the pinion 23, either from the above described automatic operating mechanism AM, or from the conventional mold turning cam shaft 27 at the rear of the machine, are subjected to a frictional braking action by a spring pressed friction brake 130 (FIGS. 2 and 3). This brake comprises a disk of friction material 136 confined between the rear side of the driving pinion 23 and a spring pressed, non-rotating brake disk 138 disposed in the rear thereof. Such brake disk is held against rotation by a notch or flat spot 139 in its periphery which fits over a stationary locking stud 142 mounted in the machine frame 24. Compression springs 135 are confined between the back side of the brake disk 138 and pockets 136 in a spring retainer 139, these springs serving to maintain a continuous braking pressure of the brake disk 138 against the friction disk 136.

It will be seen from the foregoing that the over-running clutch 45 performs two functions in its interposed position between the mold disk pinion 23 and the electric motor 702. The first of these functions is that of an over-running or slippage element when the mold disk pinion 23 is being mechanically driven from the rear cam shaft 27 for rotating the molds between casting and ejecting positions. At that time, the clockwise rotation of the mold disk pinion 23 is being transmitted forwardly through the coupling connection 116 and coupling member 115 to the over-running clutch. Here this clockwise rotation merely enters such clutch as an idling motion which the clutch cannot transmit through to the electric motor 702 because of the over-running characteristic of said clutch. Thus, the mechanically driven rotations of the mold in the casting and ejecting operations need not be transmitted back into the electric motor 702. The second function is that of converting the to-and-fro oscillatory motion of the electric motor 702 into a unidirectional ratcheting rotation when the electric motor drives the mold disk in selecting different molds, as has been previously described.

Referring now to the disconnect clutch 35, this clutch comprises a driving clutch sleeve 152 slidably mounted upon the adjacent ends of the two shafts 25 and 26, and normally urged in a forward direction by a compression spring 156 confined between the rear end of the sleeve 152 and a stop collar 158 on the shaft 26. The driving clutch sleeve 152 has keyed connection with the rear drive shaft 26 through a drive washer 164 which is secured to the end of the sleeve 152 by screws 166. As shown in FIG. 7, this keyed connection resides in providing the washer with an elongated drive opening 167 therein having opposite flat sides 168, which flat sides engage over flat splayed surfaces 169 formed in the end of the shaft 26.

Projecting from the other end of the driving sleeve 152 is a so-called locator pin or "shot" pin 170 having a tapered end which is adapted to enter a tapered socket 171 formed in a driven clutch sleeve 172. This driven clutch element 172 is secured by a transverse pin 173 to the end 25' of the pinion drive shaft 25. There is preferably one tapered clutch pin 170 mounted in the end of the driving clutch sleeve 152, and there are preferably three spaced clutch sockets 171 formed in the opposing end of the driven clutch sleeve 172. Secured over the exterior of the driving sleeve 152 against a shoulder 174 is a thrusting disk 175 against which endwise pressure can be exerted for separating the two clutch halves 152, 172 whenever it is desired to operate the disconnect clutch 35.

Referring now to the electrically responsive mechanism for automatically separating the driving and driven elements of the clutch 35, separating pressure is adapted to be exerted against the outer face of the separator disk 175 by the ends of two spaced fork arms 177 pivotally mounted at 179 on suitable bracket arms 181 of a bracket structure 183. The other ends of the fork arms converge together and are pivotally joined at 175 to the end of a solenoid core 187. This core is adapted to be drawn into at solenoid 690 which is suitably mounted adjacent to the clutch 35 on the bracket structure 183. It will be seen that when the solenoid 690 is energized, the fork arms 177 will be swung counterclockwise (FIG. 3) to exert inward pressure against the separator disk 175 for thereby releasing the driving clutch element 152 from the driven clutch element 172. In such clutch releasing operation, the swinging of the fork arms also serves to operate a control switch 691 which is mounted adjacent to one of these fork arms. As shown in FIG. 3, a clip 189 projects laterally from the fork arm and carries a thrusting pin 191 which is adapted to push against a switch operating arm 192 upon the swinging of the fork arm. This arm 192 actuates a plunger 194 extending into the housing of the switch 691 for operating the contacts thereof. A light tension spring 195 is connected between the converged lower ends of the fork arms 177 and the solenoid bracket structure 183. This spring merely keeps a light damping pressure on the fork arm assembly to keep the sleeve and collar assembly 152, 175 from bouncing and causing faulty operation of the switch 691 in the event that the shot pin 170 does not locate properly in the tapered socket 171 when reengaging. The operation of the switch 691 serves through the circuitry connections, to be presently described, to effect advancement of the rotary solenoid 702 to the position indicated by the tape signals.

ELECTRONIC CONTROL CIRCUITRY FOR KNIFE BLOCK AND MOLD DISC

The operation of an automatic linecasting machine which includes control means for effecting the automatic positioning of a saw, the automatic positioning of an adjustable knife relative to the stationary knife, the automatic positioning of the mold disc, and the automatic selection of the magazine is first briefly set forth as an aid to an understanding of the invention.

Figure 15:
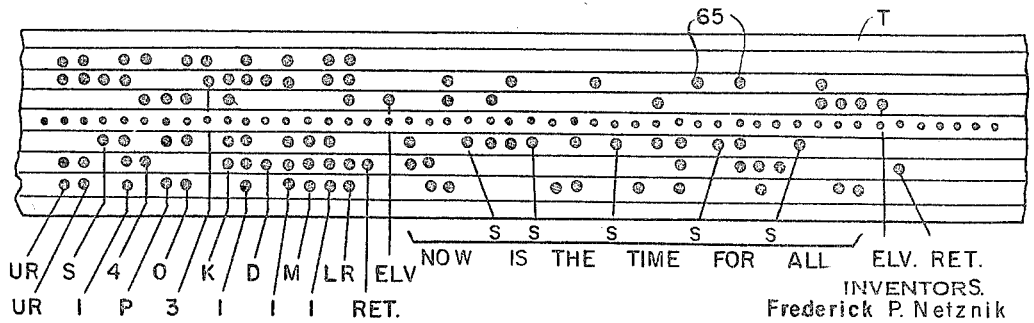

The operation of an automatic linecasting machine of such type is described in detail in the copending application, Serial No. 407,200, which was filed on October 28, 1964, by Frederick P. Netznik and Joseph Gardberg and assigned to the assignee of this invention. By way of brief outline, in its normal operation a tape member T (a small segment of which is shown in FIGURE 15) is fed to a conventional tape reader TR on the linecasting machine which senses the codes on the tape, and provides signals representative thereof. The tape in the disclosed system has six longitudinal rows or levels which are punched in different bit combinations up to six and disposed transversely in six different levels on the tape member. As the tape T is advanced intermittently, step by step, through the tape reader TR, and as each transverse line of single perforations enters the sensing zone of the reader, sensing fingers or plungers determine the presence of the perforations and the tape level in which they occur, and a set of contact fingers CS0–CS5 operate in accordance therewith.

With reference to FIGURE 15, the first set of coded signals on the tape T shown thereat are used to control the machine in the production of a slug (i.e., LR, RET now . . . all). As the coded signals there shown are sensed by the sensing fingers CS0–CS5, the equipment is operative to assemble the indicated line in the assembling elevator in known linecasting machine operation. Briefly, as each code signal is sensed, the six code bars operate to select the character indicated, and the selected code bars are thereafter triggered by a mechanical action to drop the desired character from the linecasting machine magazine to the assembling elevator.

As the tape advances to effect the selection of the successive characters (not shown), the line is assembled in known manner. After the line is assembled, the elevate signal on the tape is read out, and in normal operation, the line is delivered to the assembling elevator, and thence to the delivery slide for the full cycle of casting, trimming and sawing to length.

However, in the event that a set of function control signals precedes the next line on the tape (i.e., a request for a change of slug length which requires resetting of the saw position occurs before the next line) the cycle for the next line (i.e., "n," "o," "w," etc.) will occur only after the requested functional controls have been effected.

As shown in the exemplary tape of FIGURE 15, the functional control signals there illustrated comprise a pair of upper rail signals UR, UR, a saw positioning signal S followed by two digits "1" and "4" which indicate the pica position desired for the saw, a spacer letter P followed by two digits "0" and "3" indicating the point position of the desired saw setting, the letter K and the digit "1" indicating that the knife block is to be adjusted to position 1, the letter D followed by the number "1" indicating that the mold disc is to be adjusted to the position 1, the letter M followed by digit 1 indicating the magazines are to be adjusted to combination or condition 1, the signal LR which constitutes a lower rail signal, the signal RET which constitutes a return signal, and the signal EL which constitutes the elevate signal.

The control circuitry is responsive to the receipt of two upper rail signals UR, UR to automatically effect blocking of the equipment from normal typesetting response, and thereafter in response to the signals S14P03 is operative to effect adjustment of the saw to the 14 pica 03 point position as set forth in detail in the above identified copending application. Briefly, as the tape advances to effect readout of the two upper rail signals UR, UR, a selector mechanism in the system controls a blocking bar to move from its normal typesetting position to its control or type blocking position. The blocking bar remains in such position during the readout of the subsequent signals on the perforated tape with the exception of the lower rail signal and of the elevate signal so that the typesetting equipment will not respond to the coded information which appears on the tape after the letters UR, UR. After the code UR, UR has shifted the equipment to the command position, and the letter S has been registered on the code switches CS0–CS5 (FIGURE 10), a bit switch operates to read the letter S as marked on the code switches CS0–CS5 into a matrix M.

The matrix M may be of a conventional structure in which markings on the input conductors M0–M5 in a six unit binary code are translated into markings on digit conductors N1–N0 to indicate the receipt of digits 1–0 (the upper edge of matrix M) and markings on the horizontal conductors 0, $\bar{0}$ . . . 5, $\bar{5}$ to indicate the detection of letters D, K, M, P and S (the right hand side of matrix M). A specific matrix which is so operative is disclosed in detail in the copending application.

With readout of the letter S by the code switch CS0–CS5 the matrix M marks conductor S with a negative potential signal and the saw positioning circuitry SPC is prepared in response thereto to respond to the further signals which relate to the desired saw position. Thus, as the pica digit (14), spacer character (P), and point digits (03) are received by the matrix M, the digit conductors DC and character conductor P on the saw position circuitry SPC are energized accordingly.

The saw positioning circuit SPC operates a 4R relay (not shown) which opens the energizing circuit for the elevate circuitry (FIGURE 12) and operates the saw position motor to set the saw to the point and pica position which has been requested. After such setting has been accomplished, the saw position circuitry SPC terminates the saw position adjustment, and sends a signal to indicate to the circuitry that the desired positioning of the saw has been accomplished. At such time the 4R relay restores to recomplete a part of the elevate circuitry. However, as will be shown, the elevate solenoid ES will only operate after the tape has been advanced to effect readout of the elevate signal which appears at the end of the command information.

Additionally, as will be disclosed herein, novel control circuitry is also operative (a) in response to the code K1 signals on the tape T to adjust the knife block to the first position of seven predetermined positions, (b) in response to code D1 signals on the tape T to adjust the mold disc to the first position of six available mold positions, and (c) in response to code signals M1 to adjust the magazines to the first of four possible operating conditions.

Briefly, as the tape T advances, and the knife block, mold disc, and magazine code signals K1, D1 and M1 respectively are successively sensed by contacts CS0–CS5, (FIG. 10) and fed into matrix M, the matrix horizontal output conductors 0, $\bar{0}$ . . . 5, $\bar{5}$ are marked to energize, in sequence, the conductor K, N1; D, N1; and M, N1.

By way of specific example, with the sensing of the code signals for character "k" by contacts CS0–CS5, horizontal output conductors $\bar{0}$, 1, 2, 3, 4, and $\bar{5}$ are marked, and a negative potential signal is transmitted over conductor K to the knife block control circuit KB (FIGURE 11) to indicate that a knife block setting is required. With sensing of the digit immediately subsequent to the letter K (digit 1 in the present example), matrix M marks conductor N1 with a negative potential signal which is transmitted to an input circuit for latching circuit or register 561 in knife block control circuit KB, and an input circuit for latching or register circuit 661 in mold disc control circuit D, and input for the magazine control. As will be shown, only the latching circuit 561 associated with the knife block control circuit is enabled to register the digit 1 at this time.

In a similar manner, as the tape advances and contacts CS0–CS5 effect readout of the signals for character "D" the horizontal output conductors $\bar{0}, 1, \bar{2}, \bar{3}, 4, \bar{5}$, are marked in matrix M, and a negative signal is extended over conductor "D" to the mold disc control circuit MD (FIG. 13) to indicate a request is being received for a mold disc position adjustment. As the digit occurring after the letter D (digit 1 in the present example) is readout, conductor N1 of matrix M is marked to the inputs of latching circuit 561, latching circuit 661 and magazine control input 1. However, since conductor D is marked, only the mold disc control circuitry MD will register the request for movement of the mold disc to position 1.

As the tape advances, and contacts CS0–CS5 sense the signals for the character M, matrix M marks output conductors $\bar{0}, \bar{1}, \bar{2}, 3, 4, 5$ and conductor "M" which extends to the magazine control circuitry is energized. As the digit on the tape immediately after the signal "M" on the tape is sensed by fingers CS0–CS5 (digit 1 in the present example) the conductor N1 is marked and a signal is transmitted to an input circuit for latching circuit 561, latching circuit 661 and magazine control input 1. Since the magazine control conductor M is marked, only the magazine control circuit MG will mark its registers to indicate the magazines are to be operated to condition 1.

As the elevate signal EL at the end of the command signals is received, the elevate switch is closed and the machine runs through a dry cycle during which the knife block control circuitry (KB—FIG. 11) effects adjustment of the knife to the position indicated by the digit registered.

After the dry cycle is completed, and as the knife has been adjusted to the desired position (or if the knife was in such position), the knife block control circuitry KB transmits a signal over sequencing conductor 568 to the mold disc control circuitry MD which responsively effects adjustment of the mold disc to the position indicated by mold disc position digit on the register circuits 661–666 (digit 1 in the present example). If a change of position is required, the mold disc control circuitry MD moves the mold disc to the requested position. If the mold disc is in the requested position, or at such time as the requested position is reached, the mold disc control circuitry MD will enable the magazine control circuitry MG to effect a major shift, if such shift has been requested.

Disgressing briefly, shifting of the four magazines each of which carries a different set of matrices, are divided into major shifts and minor shifts. That is, in the first position, magazines 1 and 2 will be aranged for selective use in a typesetting operation, and in a second position the magazines 3 and 4 are arranged for selective use in a typesetting operation. If magazines 1 and 2 are in position, and it is necessary to bring the magazines 3 and 4 into position such shift of the two pairs of magazines is identified as a major shift, and can be effected only after the knife and mold disc settings have been satisfied.

However, in the event that the magazines 1 and 2 are in position for use, and the request is for magazine 1, such shift is identified as a minor shift, and such shift can be made immediately at the time of the readout of the magazine information into the magazine control circuitry MG. That is, the minor shift will be made without waiting for a signal from the mold disc circuitry MD indicating that the knife block and mold disc have been set to the requested positions.

*Knife block control circuitry KB*

The knife block control circuitry KB is shown in detail in FIGURES 11, 12. As there shown, the knife block control circuitry KB includes seven marking or latching circuits 561–567, each of which is connected to register a different one of the seven marking signals which are provided over conductor N1–N7 by matrix M to request the seven different positions of the knife block. In marking of the matrix conductor N1, for example, to request movement of the knife block to position 1, a marking signal is provided for the first latching circuit 561; with the marking of the matrix conductor N2, a marking signal is transmitted to the input circuit for the second latching circuit 562, etc.

Each latching circuit, such as 561, basically includes three switches, such as 570, 580, 583, which operate, and hold, to register the receipt of a signal over its associated input conductors, such as N1, whenever the signal is for the knife block control circuitry KB. Function prepare relay 585 which is connected common to the latching circuit is operated whenever a signal is registered on one of the latching circuits 561–567. The switches, such as 580, 583 for a latching circuit, such as 561, maintain such registration (and function prepare relay 585 operated) until reset by a signal over an associated reset conductor, such as reset conductor MK1 for latching circuit 561.

As noted above, the matrix conductors N1–N6 are also connected to latching circuits in the mold disc control circuit MD and the conductors N1–N4 are connected to the magazine control circuitry MG, but such signals are without effect at this time since only the latching circuits 561–567 in the knife block control circuit KB have been prepared to respond thereto.

A selector circuit SC which enables the latching circuits 561–567 to respond in such selective manner includes flip-flop circuit 505, 510 which is connected to the matrix conductor K. As will be shown, selector circuit SC enables the associated latching circuits 561–567 for operation by the signals on matrix conductors N1–N7 only when conductor K is marked to indicate a knife adjustment is desired. A switch 515 connected to matrix conductor N0 provides a brief delay, during which the latching circuits 561–567 may respond to input signals on conductor N1–N7, and thereafter resets the flip-flop 505, 510.

The knife block control circuitry KB also includes a transistor switching pair 525, 530 which "hold" the circuit marked as prepared for operation until the dry cycle is completed.

A control relay 540 and switching pair 525, 530 control (a) a pot pump inhibit circuit to prevent casting of a slug, and (b) a slave relay 531 to complete an energizing circuit for the hydraulic system master valve and also the knife block hydraulic valve. As will be shown, the knife block valve moves the knife assembly away from the effective index pin or stop to permit adjustment of the head to move the pin into position which sets the knife at the desired position.

The control relay 540 is controlled by a cycle relay 554 (contacts 555) and an inhibit relay 558 (contacts 559). As will be shown, if the equipment is in cycle when the command for a knife adjustment is received, the cycle relay 554 will enable the control relay 540 after the cycle is completed. If the machine is not in cycle, the inhibit relay 558, which is operated as the elevate signal ES following the command information is received, enables the control relay 540. A function prepare relay 585 along with microswitch 591 (FIGURE 12) also controls the energizing circuit for the head motor 75 which in turn adjusts the turret head mounting the index pins to the desired position. A solenoid 120 disengages a positioning detent pin to permit movement of the turret head.

A position marking switch PMS synchronized in its movements with the head motor 75 marks the different indicator circuits KB1–KB7 as different pins are moved into position to provide different positions for the knife. As the head moves the desired pin into position, a marking signal from position marking switch PMS resets the energized one of the latching circuits (561 in the present example).

A reset switch 550 is connected to reset the switching pair 525, 530 after the dry cycle is complete. The cycle relay 554 also extends an enabling signal from capacitor 537 over conductor 568 as the cycle and knife adjustment has been completed.

SPECIFIC DESCRIPTION OF KNIFE BLOCK CONTROL CIRCUITRY KB

With reference to FIGURE 11, marking conductors N1–N7 and conductor K are connected from the matrix M to separate inputs from knife block circuitry KB. With sensing of the letter K (positions 1, 2, 3, 4, on the tape T—FIG. 15) by contacts CS0–CS5, matrix M is energized to provide a marking signal over conductor K to one input of the selector circuit SC in control circuit KB, and with readout of the digit 1, matrix M marks conductor N1 to provide an energizing signal to the input circuit for the first latching circuit 561. With readout of the digit 1 an energizing signal is also provided over conductor N0 to the reset circuit 515 for the flip-flop circuit 505, 510.

Figure 10:
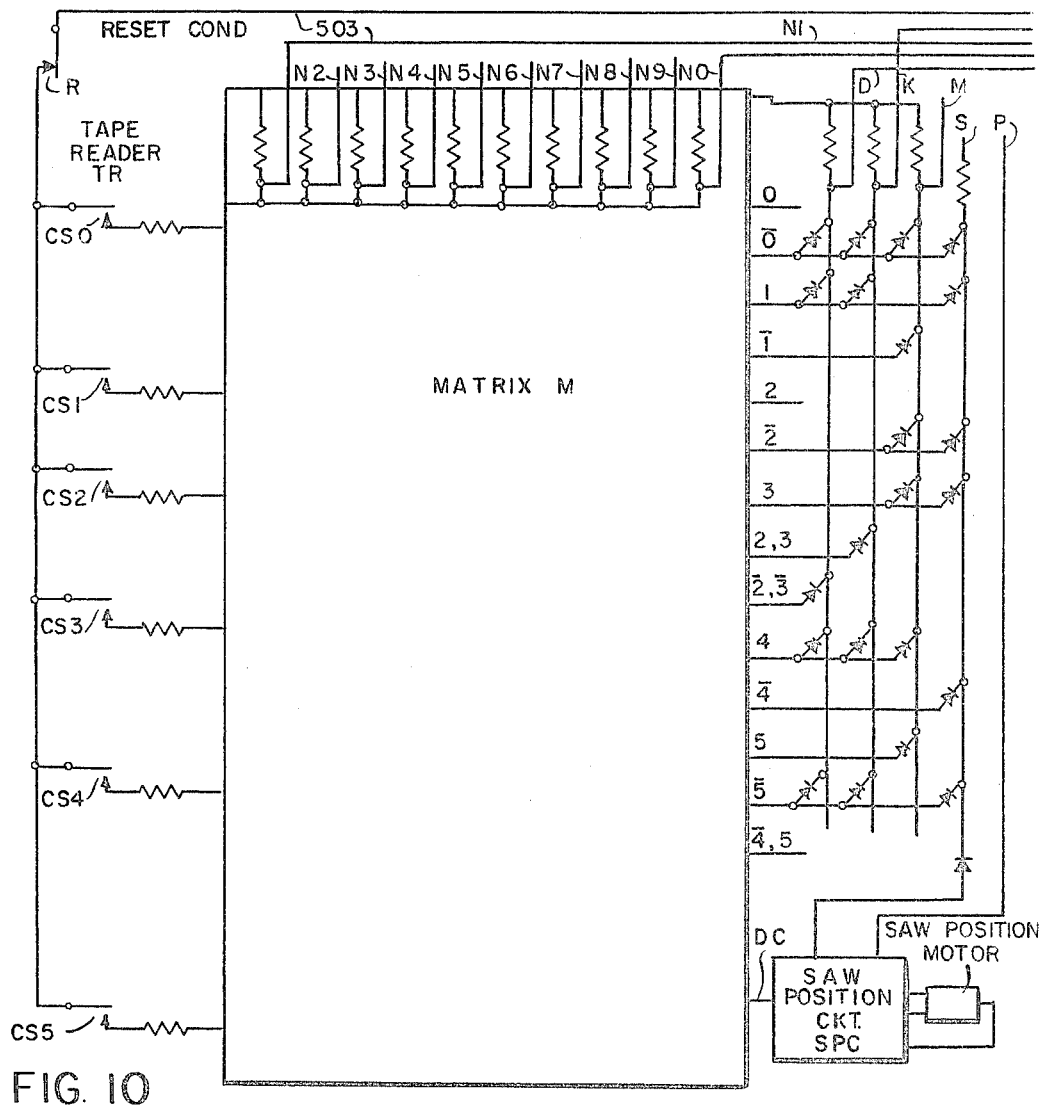

Selector circuit SC is also connected to the system reset conductor 503 (FIG. 10). As noted in the copending application contacts R are normally closed and positive potential (+55 v.) is normally extended over the reset conductor 503 by the control circuitry whereby operation of the selector circuit SC is normally inhibited. Immediately after the receipt of the signals UR, UR and the blocking of the typesetting unit in response thereto reset contacts R are opened, and positive potential is removed from the reset conductor 503 to permit response by the selector circuit SC to any signals received over the K conductor input circuit from matrix M.

More specifically, the selection circuit SC for the knife block control circuit KB basically comprises a flip-flop circuit including transistors 505, 510. Transistor 505 may be of the type commercially available as a 2N1302 which includes a collector element connected over resistor 512 to +15 volt potential and over resistor 513 to the base of transistor 510, an emitter element connected to zero volt potential; and a base element connected to the junction of resistors 502, 506 in the voltage divider including resistors 502, 506, 507 which is connected between +15 volts and −5 volts potential. The base of transistor 505 is further connected over resistor 503' to the system reset conductor 503, and over resistor 501 to the K marking conductor which extends from matrix M.

Transistor 510 may be of the type commercially available as a 2N1302 which includes an emitter element connected common with the emitter of transistor 505 to zero potential, a base element which is connected to the junction of resistors 513, 514 in the voltage divider 512, 513, 514 and a collector element connected over resistor 507 to +15 volt potential, and over resistor 506 to the base of transistor 505.

With the system in the reset condition, +55 volt potential normally applied over the reset conductor 503 and resistor 503' to the base element of transistor 505, the transistor 505 is normally turned on, and the zero potential which occurs at the collector thereof provides a negative potential to the base of transistor 510 which is turned off. As a result the potential on conductor 524 goes more positive to cut off the input circuits to each of the latching circuits 561, 567 for response to signals received over the matrix marking conductors N1–N7.

The base element of transistor 510 in the selector circuit SC is also connected to the emitter element of transistor 515 which further includes a collector element connected to the −5 volt potential, and a base element connected over capacitor 517 to zero volt potential, and over resisor 516 to matrix conductor N0. As will be shown, the flip-flop is set as the "k" signal is received over resistor 501, and a measured period after receipt of the matrix conductor 0 signal, which period is fundamentally determined by the value of capacitor 517, a signal on matrix conductor 0 initiates the timing period and the shift of the flip-flop back to its original state (transistor 505 on and transistor 510 off).

The collector element of transistor 505 is further connected over resistor 518 to the base element of transistor 530 in the switching pair 525, 530 which may be of the type commercially available as 2N1303 and 2N1302 respectively. The base element of transistor 530 is further connected (a) over resistor 519 to −5 volt potential, (b) over resistor 551 to the collector circuit of transistor 550, and (c) over resistor 520 and diode 521 to the collector output of transistor 525. The emitter element of transistor 530 is connected to zero volt potential, and the collector element of transistor 530 is connected over resistors 522 and 523 to the +20 volt potential. In the reset condition of the flip-flop circuit (transistor 505 on) the zero potential which occurs at the collector of transistor 505 results in a more negative potential at the base of transistor 530 to maintain the same turned off.

Transistor 525 of the switching pair 525, 530 includes an emitter element connected to +15 volt potential, a base element connected to the junction of resistor 523, 522 (and thereby the collector output of transistor 530) and a collector element connected over resistor 526 to zero volt potential and also over diode 521 and 520 to the base of transistor 530. With the selector circuit SC in the reset condition and transistor 530 turned off, the positive voltage which appears at the base of transistor 525 maintains transistor 525 turned off.

The collector element of transistor 525 is also connected to control energization of the knife block control relay 540, which circuit extends over cycle relay contacts 555, inhibit relay contacts 559 and the winding of relay 540 to zero volt potential. The cycle relay CR is energized whenever the linecasting machine is in the normal (not cycling) position and is restored only responsive to operation of the linecasting machine "off-normal," i.e., to initiate a cycle of the machine equipment.

Relay 540 includes a contact set 541 which provides a self-holding circuit for the relay 540, and further prepares a delayed enabling circuit for the mold disc control circuit MD. That is, contacts 541 prepare a charging circuit for capacitor 537 which extends from +15 volt potential over transistor 525, contacts 541, 556, capacitor 537 and over resistor 536 to −5 volt potential. The discharge circuit for capacitor 537 which is completed after the knife block adjustment is completed, extends from capacitor 537 over contacts 557, resistors 546 and 545 to −5 volt potential.

Transistor 550 which controls reset of the switching pair 525, 530 includes a base element connected to the junction of resistors 545, 546 in the discharge circuit, and further includes an emitter element connected to zero volt potential, and a collector element connected over resistor 552 to −15 volt potential, and over resistor 551 to the base of transistor 530. Transistor 550 is normally conductive, i.e., except for such period as the discharge circuit is enabled. During the discharge period, the transistor 550 is turned off, and the resultant negative signal which appears at the collector of transistor 550 is also applied to the base 530 to effect turn-off of the switching pair 525, 530.

A knife block control relay 540 further includes a set of contacts 542 which control an obvious energizing circuit for slave relay 531, and contacts 544 control a point in the energizing circuit for the pot pump inhibit circuit. Slave relay 531 has a first set of contacts 532, which control a point in the energizing circuits for the knife block valve 534 (FIG. 12), and a second contact set 533 which controls the master valve for the hydraulic system.

With reference once more to the flip-flop circuit 505, 510 which sets to initiate a knife block adjustment responsive to marking of the K conductor, it is noted that the collector element of transistor 510 is also connected to conductor 524. Since transistor 510 is normally turned off, the conductor 524 which is connected over resistor 507 to +15 volt potential is normally at +13.5 volts.

When the flip-flop sets (transistor 510 conducting) zero volt potential is connected to conductor 524.

Conductor 524 is connected over resistor 572 to the input circuit for the latching circuit 561, and over similar resistors (not shown) to the input circuits for each of the latching circuits 562-567. With transistor 510 turned off, the positive 15 volt potential on conductor 524 over resistor 572 to the input circuit of each of the latching circuits 561–567 prevents response of such circuits to any signals which are coupled over the associated matrix conductors N1–N7.

As noted above, each latching circuit, such as 561, includes an input circuit including transistor 570 and a pair of switching transistors 580, 583. Transistor 570 may be of the type commercially available as a 2N1303 which includes a base connected over resistor 571 to the associated one of the matrix conductors (latching circuit 501 is connected to conductor N1, latching circuit 562 is connected to matrix conductor N2, etc.) and also over resistor 572 to the output of transistor 510 in flip-flop 505, 510. Each transistor, such as 570, further includes a collector connected to −15 volt potential, and an emitter element connected over resistor 573 to +5 volt potential. The emitter element of transistor 570 is also connected over resistor 574 to the input circuit for transistor 580. In the absence of an enabling signal from flip-flop circuit 505, 510, transistor 570 is turned on and a positive signal is extended over resistor 574 to the base element of the switching transistor 580 to maintain same turned off.

Transistor 580 may be of the type commercially available as a 2N1303 which includes an emitter element connected to zero volt potential, a collector element connected over resistors 582, and 581 to −20 volts. The second transistor 583 of the pair is controlled by transistor 580 and may be of the type commercially available as 2N1302. Transistor 583 includes a base element connected to the junction of resistors 581–582 (and the output of transistor 580), an emitter connected to −15 volt potential, and a collector connected over resistor 584 and the winding of function start relay 585 to +15 volt potential.

Capacitor 588 is connected across transistor 583 and resister 583' to filter out any possible transients which might tend to cause a malfunction of transistor 583. In the absence of an enabling signal from flip-flop 505, 510 and the emitter follower 570 turned on, transister 580 is turned off and the negative potential in the collector of transistor 580 appears at the base of transistor 583 to maintain same turned off. As a result function prepare relay 585 is normally in the restored position.

The collector element of transistor 583 is also connected over resistor 583', a diode 578 and resistor 577 to provide a holding circuit for transistor 580 whenever transistors 580, 583 are turned on, as will be shown.

Each of the other latching circuits 562–567 are of the same structure as latching circuit 561, the outputs of each of the different latching circuits 562'–567 being connected common with the output of latching circuit 561 to the function prepare relay 585.

Function prepare relay 585 includes a first set of contacts 586 for completing a circuit to the head motor 75 and solenoid 120 whenever microswitch 591 (FIG. 12) is closed by the operation of the knife block valve 534 and a set of contacts 587 for energizing the inhibit relay INR while the knife setting is being effected. As will be shown, the inhibit relay INR is operative, as energized, to inhibit advance of the tape.

Motor 75 as noted above is connected to adjust the turret head to different positions, and wiper 217 of position marking switch member 595 is mechanically driven over contracts 205 by shaft 204 and motor 75 to mark position indicating conductors MK1–NK7 as the turret head is moved to select the different positions for the knife.

Each contact of the group 205 is connected over an associated position indicating conductor, such as MK1, to an associated indicator circuit, such as KB1, and an associated latching circuit reset conductor, such as conductor 569 for latching circuit 561. Each reset lead, such as 569, is connected to the switching pair, such as 580, 583, of its associated latching circuit such as 561 to control same to turn off as the motor 75 advances the head to the knife position represented thereby.

Indicator circuit KB1 (FIG. 12) includes a transistor 589 which is energized by a signal on conductor MK1 to complete an energizing circuit for lamp 599. The manner in which the circuitry is operative to adjust the turret head and thereby the knife in response to detection of a signal on the tape T is now set forth.

*Operation of knife block control circuit KB*

In the absence of a signal input to the knife block circuit (i.e., with the machine in the normal linecasting condition) reset contacts R (FIG. 10) are closed, and positive 55 volt potential is extended over the reset conductor 503, 503' to the base of transistor 505 which is therefore turned on, and the resultant zero voltage which occurs at the collector of transistor 505 causes negative potential to occur at the base of transistor 510 which turns off. Flip-flop 505, 510 is therefore in the reset condition. The zero signal which occurs at the collector of transistor 505 causes negative potential to occur at the base of transistor 530 which is turned off. The resultant positive voltage which occurs at the collector of transistor 530 also appears at the base of transistor 525 and transistor 525 is turned off. As a result, in the absence of a signal input to knife block circuit the energizing circuit for control relay 540 is interrupted by transistor 525. Additionally, assuming the linecasting equipment is not cycling, cycle relay 554 will be energized, and the energizing circuit for control relay 540 is partially completed by closed contacts 555.

With flip-flop 505, 510 reset and control relay 540 restored, the head positioning motor 593 (FIG. 12) and solenoid 594 will be inoperative. Since transistor 510 is turned off, positive 15 volt potential exists on conductor 524 to provide an inhibiting voltage over a resistor such as 572 to the base element of the emitter follower, such as 570, in each of the latching circuits 561–567. As a result, any signals applied to the latching circuits 561–567 by matrix conductors N1–N7 during such period will be without effect.

It is assumed now that the tape advances to move the command signals shown in FIGURE 15 successively into readout position. As described in the copending application, as the characters UR, UR are sensed by contacts CS0–CS5 the linesetting equipment is blocked, and the subsequent information on the tape is translated as command information (rather than linesetting information), which condition exists until the signals LR are once more detected. As the saw positioner signals S14PO3 are sensed, and applied to matrix M, the saw position circuitry SPC controls the same position motor to adjust the same motor to the position "14 pica, 3 points." During such period relay 4R (not shown) in the saw positioning circuit interrupts a point in the energizing circuit to the elevate relay ER, (FIG. 12) and the elevate solenoid ERS to prevent the operation thereof.

The tape T will continue to advance during the saw positioning operation, and accordingly the subsequent signals K1, D1, M1, LR, etc., are sensed in order.

As the character K is marked on the matrix M by contacts CS0–CS5, a negative eight volt signal will be extended over matrix conductor K to the knife block selector circuit SC, and immediately thereafter as the digit 1 is read out by contacts CS0–CS5, a negative signal is transmitted over the matrix conductor N1 to the input for latching circuit 561 and over the matrix conductor NO to the reset input "0." The response of the circuit to such signals will now be described.

Marking of request for knife control

As the negative eight volt signal is applied to the conductor K by matrix M, transistor 505 is turned off, and the resultant positive voltage potential at the collector thereof is applied to the base of transistor 510, which turns to connect zero volt potential to the conductor 524, and thereby remove the inhibiting voltage for the inputs of the latching circuits 561–567 which are connected to matrix conductor N1–N7 respectively.

As transistor 505 turns off, the resultant increase in positive potential which appears at the collector thereof, is also extended to the base of transistor 530, which turns on.

As transistor 530 turns on the resulting zero voltage at the collector thereof is applied to the base of transistor 525, which turns on to prepare the energizing circuit for control relay 540. Such circuit is presently interrupted however, by the open contacts 559 of inhibit relay 558. Transistor 525 also extends +15 volt potential over diode 521 and resistor 520 to the base of transistor 530 to hold same turned on after flip-flop 505, 510 restores.

In that the inhibit signal on input conductors for latching circuits 561–567 has been removed by the selector circuit SC in response to receipt of the character K, transistor 570 will operate as an emitter follower for signals input thereto on conductor N1. As the matrix now extends negative eight volt potential over path conductor N1 and resistor 571 to the base of transistor 570, the signal is further extended by transistor 570 to the base of transistor 580 in the latching circuit. Transistor 580 turns on, and the resultant positive signal at the collector thereof appears at the base of transistor 583, which turns on to complete an operating circuit for the function prepare relay 585. Such circuit extends from +15 volt potential over the winding of function prepare relay 585, resistor 584, and transistor 583 to −15 volt potential. Simultaneously, the transistor 583 completes a hold circuit for transistor 580 to maintain the switching pair 580, 583 turned on subsequent to removal of the input signal on conductor N1. The holding circuit extends from −15 volt potential over transistor 583, resistor 583', diode 578 and resistor 577 to the base of transistor 580.

Function prepare relay 585 operates, and at its contacts 586 prepares the energizing circuit for head adjustment motor 593 and solenoid 594 (which are presently held inoperative by the open microswitch contacts 591) and at contacts 587 prepares an energizing circuit for inhibit relay INR.

At this point it is noted that the values of the resistors 584, 584a–584f have been selected with reference to the value of the winding of relay 585, and as relay 585 operates, the end of the winding connected to conductor 524 drops to approximately +3 volts. With conductor 524 at +3 volts, the remaining circuits 562–567 cannot latch.

At the same time that the conductor N1 was marked by matrix M, a similar signal was transmitted over matrix conductor 0 (i.e., any time one of the digit conductors N1–N9 is energized, the matrix conductor N0 is also energized), and transistor 515 which is normally off, is turned on, whereby a −5 volt signal is coupled to the base of transistor 510 to turn transistor 510 off, and the resulting positive voltage which occurs at the collector thereof also appears at the base of transistor 505 to cause same to turn on, whereby flip-flop 505, 510 is reset.

The positive-going signal which now appears at the collector of transistor 510 is extended over conductor 524, and resistors, such as 572, in the input circuit of each of the latching circuits 561–567, whereby any further signals which appear on matrix conductors N1–N7 during the period in which the knife block control circuit KB is in the marked condition will be ineffective to register information on the latching circuits 561–567.

Capacitor 517 associated with the transistor 515 and 513 provides a time delay in addition to the time between operation and reset of the flip-flop which is of sufficient interval to permit the signal which is marked on the selected one of the matrix conductors N1–N7 to be effective.

At this time, therefore, flip-flop 505, 510 has been reset to its original position; the switching transistor pair 580, 583 in the latching circuit are turned on; function prepare relay 585 is operated, and the switching transistor pair 530, 525 in the enabling circuit are turned on. Such condition is maintained during the period that the tape advances over the subsequent command information (D1, M1, etc.). During the tape advance the further command information relating to the mold disc control and the magazine control is registered on the respective control circuits MD, MG (FIGS. 15, 16; 18, 19).

Operation of knife block motor

The energizing circuit for the head adjusting motor 75 which adjusts the turret head to move the desired index pin for the knife to the proper position will not be completed until the dry cycle of the machine is initiated. It will be recalled that as the result of the registration of the coded signal K1, transistor 525 is turned on at this time. Assuming that the machine was not in cycle at the time, the knife position request signal is registered on the latching circuit, and the energizing circuit for control relay 540 is presently interrupted only by the contacts 559 on the inhibit relay 558.

It will be further recalled that during the saw positioning operation, the saw control circuitry SPC energizes relay 4R to open contacts 4R1 (FIG. 12) to thereby prevent operation of the elevate relays ER and elevate solenoids ES. As shown, elevate relay ER at contacts ER1 prevents operation of the inhibit relay 558 at this time. As the saw positioner completes the saw setting operation, relay 4R restores to close contacts 4R1 in the energizing circuit for the elevate relay ER. Normally, the tape will have advanced to complete the readout of the command information on the tape T relating to the desired position of the knife, the mold disc and the magazine prior to completion of the saw positioning, and the tape advancement has been stopped by reason of mechanical means which are a part of the conventional tape reader and operate responsive to an elevate signal on the tape. The tape reader remains disabled until an elevate operation is completed.

With readout of the elevate signal the elevate switch contacts (FIG. 12) are closed. Thus as the 4R relay restores after the saw positioning, contacts 4R1 (FIG. 12) close to complete the energizing circuit to the elevate relay ER which circuit extends from 24 volt potential over contacts 4R1, elevate switch contacts ES, and the elevate relay to +55 volt potential. Since slave relay 531 is not operated, contacts 533' are closed and the energizing circuit for elevate solenoid ES is completed to start an elevate operation.

Elevate relay ER operates, an at its contacts ER1 (FIG. 11) completes the energizing circuit for the inhibit relay INR, the circuit extending from +15 volt potential over contacts 587, the winding of inhibit relay INR, and contacts ER1 to zero volt potential.

Inhibit relay INR operates, and at its contacts INR1 completes a self-holding circuit in parallel with the elevate relay contacts ER1, and at its contacts 559 completes the circuit to the control relay 540, the circuit extending from +15 volt potential over transistor 525, contacts 555, 559, and winding of control relay 540 to zero volt potential, and at its contacts 559' energizes the TTS clutch to terminate further advance of the tape T.

Control relay 540 operates, and at its contacts 541 completes a self-holding circuit in parallel with the aforedescribed energizing circuit, the circuit extending from +15 volts over transistor 525, contacts 541, the winding of relay KCR to zero volt potential; at its contacts 542 completes an obvious energizing circuit for slave relay 531; at its contacts 544 interrupts the energizing circuit to the pot pump to prevent the pot pump from providing lead for the casting of a slug during the current cycle (dry cycle) of the machine, and at its contacts 544a prepares a charging circuit over resistor R for capacitor C in the false slug circuit.

Slave relay 531 operates, and at its contacts 532 operates the knife block valve KBV (FIG. 12) to provide hydraulic power to the adjusting mechanism which moves the knife away from the turret head, at its contacts 533 prepares a circuit to operate the master control valve MV for the hydraulic system (which remains disabled until switch contacts 538 close after approximately 25% of the cycle has been completed), and at its contacts 534 opens a point in the circuit for elevate solenoid ES.

As the elevate solenoid operated, it was further effective to initiate cycling of the linesetting machine in a "dry" cycle, in which the machine operates but does not cast a slug.

A predetermined interval after initiation of the machine cycle by the elevate solenoid, cycle switch contacts CS are mechanically opened to interrupt the circuit to the cycle relay CR (which restores) and at its contacts 555, opens the initial operating circuit to control relay 540 which holds over contacts 541. Simultaneously, the cycle relay 554 closes contacts 556 to complete a charging circuit for capacitor 537 which extends from +15 volts over transistor 525, contacts 555, 559, 556, capacitor 537 and resistor 536 to −5 volt potential.

Digressing briefly at this point, if the machine was in cycle at the time the knife position request signal was registered on the latching circuit to energize function prepare relay 585 and inhibit relay 558, the cycle relay 554 will be restored and the control relay 540 will be held restored by open contacts 555. In such event the control relay 540 is operated to initiate the desired setting when the cycle is completed and cycle relay 540 is energized.

At such time as the machine advances through approximately the first 25% of its cycle, switch 538 closes to complete the circuit to the master valve MV for the hydraulic system. As the master valve opens, the knife is moved away from the index pins on the turret head and switch contacts 591 are closed to complete an operating circuit for the motor 75 and the parallelly-connected solenoid 120, the circuit extending from one side of the 110 volt A.C. source over the contacts 586, switch contacts 591, in parallel over motor 593 and solenoid 120, and the other side of the 110 volt A.C. source.

The solenoid 120 operates to disengage the detent from the turret head, and motor 75 which may be a conventional A.C. gear motor which operates at approximately 35 r.p.m., rotates the head to advance the turret head in the manner described herein. The detent is held withdrawn by the solenoid 120 to permit such movement until such time as the power is removed, and the motor 75 continues to rotate until the turret head advances to the position which achieves positioning of the knife at the requested setting.

A rotatable position marking switch 595 having a contact finger 217 connected to positive 55 volt potential is rotated with the motor to successively engage different ones of the contacts 217 and marking conductors MK1–MK7 as the head is moved to the successive knife setting positions. With the head set to locate the knife in position 1, the contact finger 217 on switch 595 engages marking conductor MK1 of the group of conductors MK1–MK7. In a like manner, when the head is set to locate the knife in position 2, the contact finger engages conductor MK2, etc. Assuming in the present example, that the head was at position 6 as the motor 75 is energized, the turret head and associated switch 595 are moved in a closkwise direction to advance the contact finger 217 into engagement with each of the marking conductors MK7, MK1, and the positive 55 volt potential is applied to the conductors MK7, MK1 which are connected to the latching circuits 567, and 561 respectively.

In that the switching relay pair in latching circuit 567 (similar to switching pair 580, 583 in latching circuit 561) are turned off, the connection of +55 volt potential thereto will not result in any change in such circuit. However, as the contact 217 advances into engagement with the marking conductor MK1, positive 55 volts is extended over conductor 569, diode 576, and resistor 575 to turn off transistor 580 in the latching circuit 561. The potential on conductor MK1 also results in the energization of transistor 589 in the indicator circuit KB1 which in turn completes an energizing circuit to indicator lamp 599.

As transistor 580 in the latching circuit 561 is turned off, the negative potential which appears at the collector thereof also occurs at the base of transistor 583 to turn off transistor 583, and thereby interrupt the energizing circuit for the function prepare relay 585 which restores, and at its contacts 586 interrupts the energizing circuit for head motor 75. As a result the motor 75 coasts to rest, and the solenoid 120 is de-energized to release the detent latch 114.

The motor 75 coasts by reason of inertia to drive the detent latch 114 into the detent slot associated with such position. A friction clutch 84 allows over-coasting without damaging the gears.

Function prepare relay 585 at its contacts 587 interrupts one of the energizing circuits to the inhibit relay INR. That is, as will be shown, in the event that none of the latching circuits 661–666 (FIGURE 5) for the mold disc control circuitry have been marked (i.e., no tape signal has been received requesting a mold disc setting), and in the event that no signal information relating to the magazine position is received, the inhibit relay INR will be held operated over corresponding contacts CS0–CS5 have detected either a signal on the tape relating to a desired mold disc position or a signal relating to a desired magazine position, the inhibit relay 1NR will be held operated over corresponding ones of parallel contacts 642, 687' (FIG. 13) or corresponding contacts in the magazine circuitry shown in the copending application filed Sept. 13, 1965 by George Robert Jackson and Patrick J. McCauley and assigned Serial No. 486,638.

In the event either the turret head, the head motor 75, or the position marking switch 595 have jammed, and did not reach the requested position registered on the latching device 561, the +55 volt signal would not be transmitted over marking conductor MK1 to the latching circuit 561, and function prepare relay 585 would hold and the inhibit relay INR would be held operated. Accordingly, even though a mold disc and/or a magazine request were made and satisfied, the failure to satisfy the knife position request would result in a locked-up condition of the function prepare relay 585 and the inhibit relay INR, and accordingly the tape T would not be advanced until such time as the malfunction was located and corrected. After approximately one minute a timing circuit (not shown) removes power from all circuits.

As the dry cycle of the machine continues, and approximately 85 percent of the cycle has been completed, master valve switch contacts 538 (FIG. 12) open to interrupt the energizing circuit for the master valve MV in the hydraulic system to relieve the pressure from the system, and switch contacts 591 are opened to interrupt a further point in the circuit to the motor 75. It should be further noted that if a malfunction had occurred wherein the function prepare relay 585 had not restored, the restoration of the master valve MV as a result of the machine cycling would result in interruption of the circuit to the motor 75, and the de-energization thereof.

At the end of the dry run, cycle switch contacts CS (FIG. 11) are mechanically closed to energize the cycle relay 554 which operates, and at its contacts 555 closes a point to reprepare the original energizing circuit for control relay 540; at its contacts 557 connects the capacitor 537 over a discharge circuit which includes resistors 536, 546, transistor 550 and resistor 522 to −15 volt potential.

As capacitor 537 discharges over such circuit, the positive potential applied to the base of transistor 550 turns off transistor 550, and the resultant negative potential at the collector element thereof appears at the base of transistor 530 which turns off, and in turn provides positive potential at the base of transistor 525, which turns off. With the turn-off of transistor 525, the energizing circuit for control relay 540 and the latching circuit for transistor 530 is interrupted.

Control relay 540 restores, and at its contacts 541 further interrupts its self-holding circuit, at its contacts 542 effects the release of slave relay 531, at its contacts 544a connects the charged capacitor C to the false slug detector circuit which purposely results in an indication that a slug has been detected (even though it has not) so that the equipment will not inadvertently be locked in the cycling of the machine, and at its contacts 544 restores the pot pump circuit.

Slave relay 531 restores, and at its contacts 532 interrupts the holding circut for the knfe block valve 534 (FIG. 12); at its contacts 533 interrupts a further point in the circuit to the master valve MV (FIG. 12), and at its contacts 533' re-establishes a point in the energizing circuit for the elevate solenoid ES, which at this time is interrupted by the elevate switch contacts ES which were opened immediately after the elevate cycle was completed.

The discharge circuit for capacitor 537 (FIG. 11) which as noted above was completed over cycle relay contacts 557, resistor 546 and 552 to −15 volt potential, also resulted in a positive potential signal being applied over conductor 568, diode 632 and resistor 631 to the base of transistor 630 in the mold disc control circuitry MD. As will be shown, in the event that information on the tape indicates that a mold disc control adjustment is desired (in which event, one of the mold disc registers 661–666 would be enabled to indicate the nature of the mold disc positioning desired), or alternatively if a magazine change has been requested (and a corresponding one of the magazine control circuits are marked) negative bias will have been removed from the base of transistor 630, and accordingly as the positive signal is received over conductor 568 from the knife block control circuitry KB following adjustment of the knife to its desired position, transistor 630 will turn on.

If neither a mold disc request or a magazine request has been detected, transistor 630 will remain turned off. In such event, each of the contacts 587 (FIG. 11), 687' and 642 (FIG. 13) and MR1–MR4 (FIG. 15) will also be open, and the energizing circuit for the inhibit relay INR will be interrupted so that advancement of the tape once more occurs. The machine is now operating in a normal line setting mode.

Assuming, however, that either an instruction for a mold disc change or a magazine change was detected, transistor 630 turns on, and the more negative voltage which appears at the collector thereof also occurs at the base of transistor 625, which turns on to complete an energizing circuit for the control relay 640, which circuit extends from +15 volts over transistor 625 and the winding of relay 640 to zero volts potential. The energizing circuit completed over transistor 625 is also extended over diode 621 and resistor 620 to the base of transistor 630 to hold same operated after the input signal received over conductor 568 from the knife block circuit KB is removed.

It will be apparent therefrom that as the knife block control circuitary KB completes adjustment of the knife to the position requested, a control signal is transmitted to the mold disc control circuitary MD to cause same to operate next in sequence to adjust the mold disc to the position indicated on the tape and registered on the latching circuit 661–666.

During such adjustment, the mold disc circuitry MD provides an inhibit signal to prevent a major shift by the magazine control circuitry. In the event that no information has been detected requiring setting of the mold disc, but information relative to a magazine condition change has been detected, the mold disc circuit MD will automatically enable the magazine control circuitry MG to proceed in the adjustment of the magazines to the desired positions, as will be shown.

MOLD DISC

The mold disc accommodates a number of different molds so that slugs of different thicknesses may be cast. In the field, the number of molds on the machines which may be manually selected normally range between two to six. In the arrangement set forth herein, the mold disc is shown to include six molds. A novel mold disc control circuit MD (FIGS. 13 and 14) is responsive to the detection of predetermined mold disc control signals on the tape to automatically adjust the mold disc to the one of the positions indicated by the signal. Since a given slug thickness is determined by the mold pocket selected, and the resultant slug must be shaped by a knife block setting of a like thickness, the knife block and the mold disc are normally adjusted together. However, in some instances, independent adjustment may be desired, and the control circuitry of the invention is so operative.

The control circuitry for adjusting the mold disc to the desired position in response to the tape signals is now set forth herebelow.

*Mold disc control circuitry MD*

With reference to FIGURE 13, the mold disc control circuitry MD as there shown basically comprises latching or register circuits 661–666, each of which is connected to a different one of the matrix conductors N1–N6 to register a request for a correspondingly different one of the six mold positions, a selection circuit 600 which is operative responsive to receipt of a signal over the matrix conductor "D" to enable the six register circuits 661–666 to respond to the signal request extended by the matrix M over conductor N1–N6 to the mold disc latching circuits 661–666. As will be shown, the latching circuit associated with the received digit will respond to the marking signal. Matrix conductor "N0" is connected to a reset circuit for the selector circuit 600.

A switching pair 625, 630 is connected over conductor 568 to the output of the knife block control circuit KB, and also to the selector circuit 600 to control the time of operation of the mold disc control circuitry MD in accomplishing the command registered on the latching circuits 661–666. A series bias or marking circuit connected to transistor 625 of the switching pair is operative to mark the receipt of a request for a mold disc setting or a magazine setting. With such marking, the circuit will be in condition to initiate a control operation as the sequence sgnal is received from the knife block circuitry KB. A disc mold control relay 640 is connected for operation by the switching pair as the control operation is initiated in response to the sequence signal from the knife block control circuitry KB, and as will be shown the relay 640 energizes the tape inhibit relay 1NR to prevent advance of the tape T, and prepares both the mold disc solenoid 690 and the magazine control circuitry MG for operation.

A function prepare relay 685 is connected common to the outputs of register circuits 661–666, and is operative with the control relay 640 to control positioning circuit SSC, which includes disconnect solenoid 690 for controlling the energization of a pulse relay 696 over high limit contacts 694 and low limit contacts 695 on the rotary solenoid 702 to provide stepping pulses to the rotary solenoid 702. As noted above, operation of solenoid 702 results in adjustment of the mold disc MD to successive ones of the positions.

Indicator means for indicating the mold disc position comprise a rotary switch 706 which is operative with movement of the mold disc to different positions to provide signals back over different ones of a plurality of contacts 708 and associated marking conductors MD1–MD6 to correspondingly different ones of the latching circuits 661–666. At such time as the indicated one of the mold disc positions is reached, the corresponding one of the latching circuits 661–666 is unlatched to restore common function prepare relay 685, and thereby terminate the mold disc adjusting operation. Function prepare relay 685 in restoring also enables the magazine control circuitry MG to effect operation of the magazine to the condition indicated by the tape information. Switching pair 625, 630 and control relay 640 hold operated until the magazine setting is completed.

*Specific description of mold disc control circuitry*

The mold disc control circuitry MD is now set forth in detail. As shown in FIGURES 13, 14 the six matrix conductors N1–N6 are connected to the inputs for six latching circuits 661–666, input conductor D from matrix M is connected to selector circuit 600, a matrix conductor "N0" connected to reset circuit for selector circuit 600, and an enabling or sequence lead 568 from the output of the knife block control circuit MD is connected to the input from a switching pair 625, 630.

The selector circuit 600 for mold disc control circuit MD which is connected to matrix conductor "D" basically comprises a flip-flop circuit including a first and second transistor 605, 610 which may be of the type commercially available as a 2N1302. The first transistor 605 includes an emitter element connected to zero volt potential, a base element connected (a) over resistor 603' to the system reset conductor 503 (FIG. 10), (b) over resistor 601 to the matrix conductor "D," (c) to the junction of resistors 602, 606 in voltage divider 602, 606, 607 which is connected between negative five volt potential and positive fifteen volt potential, and (d) over resistor 606 to the collector element of transistor 610; and a collector element connected over resistor 612 to positive 15 volt potential, and over resistor 613 to the base of the second transistor 610.

The second transistor 610 of the flip-flop selector circuit 600 includes an emitter element connected to zero volt potential, a base element connected to the junction of resistors 613, 614 of voltage divider 612, 613, 614 which is, in turn, connected between positive 15 volt potential and negative 5 volt potential, and a collector element connected over resistor 607 to positive 15 volt potential, and also over resistor 606 to the base of transistor 605, and further to the common control conductor 624 for each of the mold disc latching circuits 661–666. Capacitor 608 is connected between positive 15 volt potential and conductor 624.

In the normal linesetting condition, positive 55 volts potential on reset conductor 503 is applied over resistor 603' to the first transistor 605 which is therefore turned on. The resultant zero potential which occurs at the collector thereof results in a negative potential at the base element of transistor 610, which is therefore turned off. As a result, positive 15 volt potential is connected over control conductor 624 to the input circuits of the register 661–666 to inhibit the response thereof to any input signals which may appear on matrix conductors N1–N6.

The matrix conductor "N0" is connected over resistor 616 to the base element of transistor 615 which may be of the type commercially available as 2N1303. The base element is connected over capacitor 617 to zero volt potential to provide a time delay in the switching of transistor 615. The collector element of transistor 615 is connected to the base of the second transistor 610 of the flip-flop selector circuit 600. As will be set forth, transistor 615 is normally off, and a signal on the "N0" conductor controls transistor 615 to turn on to reset flip-flop circuit 605, 610 a predetermined period after registration of the mold disc digit on the appropriate one of the latching circuits 661–666.

Since latching circuits 661–666 are similar in structure, only latching circuit 661 is set forth in detail. As shown, latching circuit 661 includes a first input circuit including resistor 671 connected between matrix conductor N1 and the base element of emitter follower transistor 670. The base element of transistor 670 is further connected over resistor 672 to common control lead 624 which is output from the selector circuit 600.

Transistor 670 further includes a collector element connected to −15 volt potential and an emitter element connected over resistor 673 to +5 volt potential and further over resistor 674 to the base element of transistor 680. The base element of transistor 680 is further connected over resistor 675 and diode 676 to a reset circuit which is enabled whenever the mold disc is in position 1. The emitter element of transistor 680 is connected to zero volt potential, and the collector element is connected over resistor 682 to the base of transistor 683 and also over resistor 681 to −20 volt potential.

Transistor 683 further includes an emitter element connected to negative 15 v. potential, and a connector element connected over resistor 689, diode 688 and resistor 687 to provide a latching circuit for its associated transistor 680, and is further connected over resistor 684, and the winding of function prepare relay 685 to positive 15 volt potential. The junction of resistor 684 and relay 685 is connected to the same point in the output circuit of each of the register circuits 662–666.

In the reset condition, positive potential on conductor 624 will normally inhibit the input circuits connected to matrix conductors N1–N6, whereby signals which appear on matrix conductors 1–6 will be ineffective to operate the switching pair, such as 680, 683. That is, transistor 670 being an emitter follower will extend the positive potential on conductor 624 to the base of transistor 680 which turns off, and the negative signals on conductors N1–N7 will be ineffective. The negative signal which occurs in the collector of transistor 680 and at the base of transistor 683 when transistor 680 is turned off will maintain transistor 683 turned off. As a result, function prepare relay 685 will be in the restored condition.

As indicated above, the mold disc control circuit MD is enabled to effect a mold disc adjustment only after the knife block setting is complete. The enabling or sequencing conductor 568 for the mold disc control circuitry extends from the knife block control circuit KB over an input circuit including diode 632, resistor 631 to the input for a switching pair 625, 630.

More specifically, transistor 630 of the switching pair 625, 630 comprises an emitter element connected to zero volt potential, a base element connected to the control conductor 568 as described above, and over resistor capacitor network 618, 619 to −5 volt potential, and over resistor 622 to a series bias circuit which includes contacts on each of the control relays for the four different magazines (contacts MR1, MR2, MR3, MR4), as well as over the contacts on function prepare relay 685 for the mold disc circuit MD, and contacts on relay 700 (FIG. 14) which, as described hereinafter, is operated whenever a mold disc adjustment is being effected. With the series bias circuit closed, a −5 volt bias is placed on the base of transistor 630 to maintain the transistor 630 turned off, even if an enabling signal is received over conductor 568 from the knife block circuit KB. If any one of the series contacts is in the open position (as the result of readout of a signal on the tape for a mold disc setting or a magazine setting) and only in such event, an enabling signal received over conductor 568 will turn on transistor 630 to initiate a mold disc adjustment.

Transistor 630 further includes an emitter element connected to zero volt potential and a collector element connected over resistors 622 to the base of transistor 625 and also over resistors 622, 623 to positive 20 volt potential.

Transistor 625 of switching pairs 625, 630 includes an emitter element connected to positive 15 volt potential, a base element connected to the output of transistor 630 as described above, and a collector element connected over the winding of relay 640 to zero volt potential, and over resistor 626 to zero volt potential. The collector is further connected over a holding circuit for transistor 630 which includes diode 621 and resistor 620 for the purpose of holding the switching pair 625, 630 turned on after the momentary enabling signal on conductor 568 from the knife block circuit KB is terminated.

As noted above, with any of the magazine control relays MR1–MR4 operated, indicating that a magazine control function is required, or with the function prepare relay 685 operated indicating that a mold disc function has been requested, the bias signal for transistor 630 will be removed to permit same to operate with the receipt of a signal over conductor 568 from the knife block circuitry. Normally, however, a bias is provided to transistor 630 by the series bias circuit, and the transistor 630 is cutoff. The resultant positive potential which appears at the collector of transistor 630 and the base of transistor 625 maintains transistor 625 turned off, and control relay 640 is therefore in the restored condition. Control relay 640 at contacts 642 controls energization of the tape inhibit relay INR, and at contacts 641 controls a point in the circuit for the mold disc positioning circuitry SSC (FIG. 14), and at contacts 686' controls enablement of the magazine control circuitry MG after operation of the mold disc circuitry MD.

The mold disc positioning circuit SSC is operative to adjust the mold disc to different positions, and associated indicator circuits, such as 715, provide signals to indicate the location of the mold disc as adjusted to the different positions.

More specifically, the positioning circuitry SSC includes a disconnect solenoid 690 which is controlled by an energizing circuit including contacts on the control relay 640 and series contacts on the function prepare relay 685. Disconnect solenoid 690 controls a control switch 691 (as noted earlier herein) which in turn control an energizing circuit for series bias circuit control relay 700, and an operating circuit for pulsing relay 696.

Series circuit control relay 700 controls the connection of potential to the series bias circuit for transistor 630 (FIG. 13) and in its operated condition prevents the disc mold control circuitry MD from restoring until such time as the necessary adjustment is completed.

Pulsing relay 696 is controlled by an energizing circuit including an upper limit microswitch 694 and a lower limit microswitch 695, which cooperate in a manner set forth hereinafter to effect the intermittent operation of the pulsing relay 696 which at its contacts 698 controls stepping of the rotary solenoid device 702.

The rotary solenoid 702 through mechanical linkage 760 drives a rotating wiper 709 of rotary switch 76 into engagement successively with each of a plurality of contacts 708 and associated marking conductor MD1–MD6, each of which contacts represents a different one of the six positions of the mold wheel. That is, as indicated above, the rotary solenoid 702 is operable to move the contact arm 709 to each of six positions, and as moved to a position, such as the first position, connects postive 55 volts over the associated marking conductor, such as MD1, which is located at such position. Each marking conductor MD1 is connected to the input for its own indicator circuit, such as 715, which includes a transistor 713 for energizing lamp 714 whenever the mold disc is in the position represented thereby and a reset conductor 669 for the one of the latching circuits 661–666 which represents such position. Each of the latching circuit reset conductors, such as 669, for the first latching circuit is connected to its associated one of the latching circuits over a diode, such as 676, and a resistor, such as 675, which is connected to the input for the switching pair, such as 680, 683.

*Operation of mold disc control circuitry MD*

As noted above, with the equipment in the control position (that is, before the receipt of the UR, UR signals which block the machine from effecting a normal line setting operation), reset switch contacts R (FIG. 10) are closed and positive 55 volt potential is extended over the reset conductor 503 to the selector circuit 600 (FIG. 11) in the mold disc control circuitry MD. As such time as the tape is advanced to move the upper rail signals UR, UR into the readout position, the linesetting equipment is blocked as set forth above and in more detail in the copending application, Serial No. 407,200, and reset switch contacts R (FIG. 10) are opened to remove the positive 55 volt potential from conductor 603 and selector circuit 600 for the mold disc control circuit MD.

With advancement of the tape T and movement of the letter "D" for readout by the tape reader TR, sensing contacts CS1 and CS4 are closed to matrix M, and a negative signal is provided by matrix M over conductor D to the selector circuit 600 (FIG. 13).

It will be recalled that with positive 55 volt potential on the reset conductor 503, transistor 605 (FIG. 11) in the mold disc control circuitry MD is turned on, and transistors 610 and 615 are turned off. In the latching circuits, such as 661–666, relays 680, 683 are also turned off. As a result, function prepare relay 685 is restored, and disconnect solenoids 690 and 702 (FIG. 14) are in the deenergized condition with relays 696, 700. Assuming that an enabling signal has not been received from the knife block control circuitry KB at this time, transistors 630, 625 (FIG. 11) will be turned off and control relay 640 will be restored.

With the reset signal removed from reset conductor 693, and the transmission of a negative signal over matrix conductor D and resistor 601 to the base of transistor 605, the transistor 605 is turned off, and the resultant positive-going signal at the collector thereof appears at the base of transistor 610 which turns on to remove positive 15 volt potential from conductor 624, and connect zero volt potential thereto. With zero potential on the input conductors to the latching circuits 661–666 any signal received over conductor N1–N6 from the matrix M will be registered by latching circuits 661–666.

As the tape now advances, and the digits associated with the letter D on the tape (digit 1 in the present example) is moved into the readout position, fingers CS0, CS1, CS3, CS4, CS5 are closed, and a negative signal is extended over matrix conductor N1 and conductor N0. The signal over conductor N1 is extended over resistor 671 to the base of emitter follower 670 which in turn applies a negative signal to the base of transistor 680.

Transistor 680 turns on, and the zero volt signal which occurs at the collector element which results in a less negative potential at the base of transistor 683, which turns on to complete an energizing circuit for function prepare relay 685, which extends from positive 15 volt potential over the winding of relay 685, resistor 684, and transistor 683 to negative 15 volt potential. Transistor 683 also completes the latching circuit for the transistor 680 which extends from negative 15 volts potential over transistor 683, resistor 689, diode 688 and resistor 687 to the base of transistor 680 to maintain same conductive as the signal received over the matrix conductor N1 is subsequently removed.

As noted above, each time a digit 1–9 is marked on the matrix M, the matrix also marks the "N0" conductor, and such signal is coupled over the resistor 616 to the base of transistor 615 in mold disc control circuitry MD. After a delay determined by the value of the capacitor 617, transistor 615 turns on to couple —5 volt battery potential to the base of transistor 610 which turns off, and the positive potential which appears at the collector thereof is extended to the base of transistor 605 to turn transistor 605 on, and is also extended over control conductor 624 to the input circuit for each of the latching circuits 661–666 to inhibit response thereof to any further markings which may appear on the matrix conductors 1–6 during the period that the equipment is in the marked position. Thus the latching circuits 661–665 are only momentarily capable of registering a mold disc request (i.e., from the time of receipt of the signal on conductor "D" until reset a brief interval after the receipt of the signal on conductor "N0").

As a function prepare relay 685 operates responsive to the registration of a digit on one of the latching circuits (latching circuit 661 in the present example), it is operative at its contacts 686 to prepare a point in the operating circuit to the disconnect solenoid 690 (FIG. 16), at its contacts 686' opens a point in the control circuitry for the magazine control circuitry MG to prevent the operation thereof during the setting of the mold disc to the desired position, at its contacts 687' completes a circuit for the tape inhibit relay INR (in parallel with the circuit completed by the knife block circuit KB) and at its contacts 685' interrupts a point in the series bias circuit for switching pair 625, 630 to permit response of the switching pair 625, 630 to the sequence enabling signal as received from the knife block control circuitry KB.

In brief review, at this time, the switching pair 680, 683 in latching circuit 661 are energized to indicate that the mold disc is to be moved to position one.

It is now assumed that the knife block adjustment is completed and that a control signal is extended over conductor 568 by the knife block control circuitry KB, and the diode 632 and resistor 631 to the base of transistor 630. Assuming the bias has been removed from the base of transistor 630 by reason of the operated condition of the function prepare relay 685 (or one of the magazine control relays indicating that a magazine control function is to be effected), transistor 630 turns on, and the resultant zero voltage which appears at the collector thereof results in a less positive potential at the base of transistor 625, which turns on to complete the operating circuit for the control relay 640 from positive 15 volts over transistor 625 and the winding of relay 640 to zero volt potential.

Transistor 625 as turned on also completes a latching circuit over diode 621 and resistor 620 to the base of transistor 630 to latch same in the "on" condition after removal of the enabling signal from conductor 568 by the knife block control circuitry KB.

Control relay 640 operates, and at its contacts 641 completes an energizing circuit to the disconnect solenoid 190, at its contacts 642 completes a parallel energizing circuit to the tape inhibit relay INR, at its contacts 643 (FIG. 13) completes a point in the operating circuit for the magazine control circuitry (which is presently held open by function prepare relay 685 at its contacts 686').

As noted above, inhibit relay INR was operated during the operation of the knife block circuitry KB and at its contacts INR2 energized the tape clutch to prevent advancement of the tape. The parallel circuit completed by control relay 640 in the mold disc control circuit MD accomplishes a similar function to prevent advancement of the tape during adjustment of the mold disc to the desired position and the magazines to the desired condition.

Disconnect solenoid 690 operates to disconnect the normal machine drive from the mold wheel and to disengage the shot pin 170 to permit adjustment of the mold wheel to a new position by the driving mechanism. Additionally control switch 691 is closed with operation of disconnect solenoid 190 (as noted above) to complete an energizing circuit from the positive side of bridge rectifier 695' over switch 691, resistor 693, microswitch contacts 694, 695, and the winding of pulsing relay 696 to the negative side of bridge rectifier 695'. As noted earlier herein, microswitch contacts 694, 695 are controlled by the rotary solenoid, the lower limit contacts 695 being closed with the rotary solenoid in its first position as determined by the return spring 41 (FIG. 3). Upper limit contacts 694 are, of course, closed at such time, and are opened as the rotary solenoid reaches the upper end of its structure.

Simultaneously with the completion of the circuit to the pulsing relay a parallel circuit is completed for bias control relay 700 from the positive side of rectifier 695' over control switches 691 and the winding of relay 700 to the negative side of rectifier 695'.

Bias control relay 700 operates, and at its contacts 701 opens a further point in the biassing circuit for sequencing transistor 630 to prevent the turnoff thereof in the event the function prepare relay 685 restores before the mold disc has been fully operated to the position indicated by the tape signals.

After a delay, which is determined by the value of capacitor 699, pulsing relay 696 operates, and at its contacts 698 completes an energizing circuit to the rotary solenoid 702, and at its contacts 697 completes a holding circuit independent of the original energizing circuit which extended over the lower limit microswitch contacts 695.

As the solenoid 702 advances from its restored position, lower limit microswitch contacts 695 open, and pulsing relay 696 is held over the described holding circuit. As the rotary solenoid advances to the upper end of its stroke, upper limit switch contacts 694 are opened to interrupt the holding circuit for the pulsing relay 696 which restores, and at its contacts 698 interrupts the energizing circuit for the rotary solenoid 702. As the energizing circuit for the rotary solenoid is operative to advance the mold disc one step, and the upper arm 709 is advanced to mark a corresponding different one of the conductors MD1–MD6. Such operation continues until such time as the mold disc is moved to the desired position, and at such time, as will now be shown, the control circuitry MD restores function prepare relay 685 to interrupt the energizing circuit for the disconnect solenoid 690 and thereby terminate the operation of the rotary solenoid 702.

More specifically, as the wiper arm 709 is advanced to the particular one of the marking conductors MD1–MD6 which is associated with the one of the latching circuits which has been marked (latching circuit 661 has been marked in the present example to indicate the mold disc is to be moved to the first position), positive 55 volts is applied by wiper arm 709 over such conductor to reset the latching circuit and terminate the adjusting operation.

In the present example, positive 55 volts on conductor MD1 turns on transistor 713, and completes an energizing circuit for the indicator lamp 714. Additionally the positive 55 volts potential on conductor MD1 is extended over conductor 669 and diode 676 (FIG. 13) and resistor 675 to the base of transistor 680 to turn off transistor 680.

As transistor 680 turns off, the resultant negative voltage which occurs at the collector thereof and the base of transistor 683 causes transistor 683 to turn off, and thereby interrupt the energizing circuit for the function prepare relay 685. Function prepare relay 685 restores and at its contacts 686 interrupts the energizing circuit for disconnect solenoid 690, at its contacts 687' interrupts the energizing circuit for inhibit relay INR (which is held operated over contacts 642 on control relay 640), at its contacts 686' prepares a point in the enabling circuit for the magazine control circuitry MG, and at its contacts 685' reestablishes a point in the biassing circuit for switching pair 625, 630.

Disconnect solenoid 690 restores, and allows the shot pin to restore against the collar with spring pressure. However, microswitch contacts 691 will not open until the shot pin enters the aperture associated with position "1" and accordingly pulsing relay 696 is held energized. At such time as the shot pin falls into the hole for the selected position, contacts 691 open to interrupt the energizing circuit for pulsing relay 696 which restores to terminate rotation of the solenoid 702 and the mold disc.

Assuming that no magazine command was present on the tape T, none of the magazine control relays will be energized. In such event, as the control switching contacts 691 open, the bias control relay 700 restores, and at its contacts 701 completes the negative 5 volt biassing circuit for transistor 630 which turns off. The resultant positive voltage which occurs at the collector thereof also appears at the base of transistor 625 to turn transistor 625 off and thereby interrupt the energizing circuit for control relay 640. Control relay 640 restores and at its contacts 641 interrupts a further point in the circuit for the disconnect solenoid 690, and at its contacts 642 interrupts the energizing circuit for the inhibit relay INR, and at its contacts 643 completes a point in the circuit for the magazine control circuitry which circuit is held ineffective.

With the restoration of the INR relay (assuming no magazine control is to be effected at this time) the contacts INR1 are opened, and the tape reader advances the tape to effect readout of the further tape signals. Accordingly, the mold disc control circuitry MD is now restored in preparation for an operation responsive to further tape signals.

In the event that the tape did include a command for effecting adjustment of the magazines to a different position, one of the relays MR1–MR4 would be energized and the above identified series bias circuit to the base of transistor 630 would be in the open condition. With switch pair 625, 630 operated, the control relay 640 in the mold disc control circuitry would have been maintained operative when the control relay 700 restored.

As a result, with control relay 640 held operated, contacts 642 would maintain the energizing circuit for the inhibit relay INR, and the tape member T would not be advanced at this time. Further, in that contacts 643 are in the closed position, an energizing circuit would be completed to magazine control circuitry as the function prepare relay 685 restores to close contacts 686'. The manner of operation of the magazine control circuitry to effect adjustment of the magazines to the desired position is set forth in the copending application, having Serial No. 486,638 which was filed Sept. 13, 1965.

A cutout relay 710 (FIG. 14) is connected to be energized by cycle relay 554 (FIG. 11) whenever the machine is in cycle (contacts 558') or whenever a main cutout relay (not shown) is operative. Relay 710 at its contacts 707 interrupts +55 volts (ground) to the wiper arm 709 to prevent the wiper arm from cancelling out information registered on the latching registers 661–666 during normal cycling of the machine.

While we have illustrated and described what is regarded as the preferred embodiment of the invention, nevertheless it will be understood that such illustration is merely exemplary and that numerous modifications may be made therein without departing from the essence of the invention.

What is claimed is:

1. In a linecasting machine, the combination of a rotatable mold disk which is operable to cyclically move a selected mold between a plurality of positions including a slug-casting position and a slug-ejecting position in a casting operation, a plurality of molds mounted in said disk, operating mechanism for rotating said mold disk to bring any desired one of said molds into position, for use in a casting cycle, a coded tape having a different code for selecting the different molds for use in the casting cycle, a tape reader adapted to read said tape, and control means connected to said tape reader for rotating said mold disk to bring the mold indicated by said signal on said tape into casting position for use in a subsequent casting cycle.

2. In a linecasting machine, the combination of a mold disk having a plurality of molds therein, a first operating mechanism operative to rotate said mold disk to transfer a selected one of said molds from a slug casting position into a slug ejecting position in the normal cyclical operation of the machine, a tape reader adapted to read a coded tape, a second operating mechanism operative in response to said coded tape to rotate said mold disk to transfer any desired one of said molds from a non-functioning position into a slug casting position, and means for rendering said first operating mechanism inoperative for said mold disk when said second operating mechanism is rendered operative.

3. In a linecasting machine, the combination of a mold disk adapted to carry a plurality of type casting molds therein and including a mold disk drive means, a first operating mechanism operative in the normal cyclical operation of the machine to rotate said mold disk drive means to move any desired one of said molds from a slug casting position into a slug ejecting position, a disconnect clutch operative to prevent the operation of said mold disk drive means by said first operating mechanism, a tape reader adapted to read code signals from a coded tape, a second operating mechanism responsive to said coded tape for rotating said mold disk drive means to transfer any selected one of said molds into said mold casting position, and means responsive to said coded tape for operating said disconnect clutch and for rendering said second operating mechanism operative to rotate said mold wheel drive means under the control of said tape.

4. In a linecasting machine, the combination of a mold disk having a plurality of molds therein, mold disk drive means, a tape reader adapted to read a coded tape, a cam shaft, cam shaft drive mechanism for operating said mold disk drive means to effect the cyclical rotaton of said mold disk from a slug casting position into a slug ejecting position, motor drive mechanism for operating said mold disk drive means to effect mold changing rotation of said mold disk to transfer any desired one of said molds from a non-functioning position into the casting position, and means responsive to said coded tape for automatically effecting a transposition of the mold disk drive means from said cam shaft drive mechanism to said motor drive mechanism when a change in molds is desired.

5. In a linecasting machine, the combination of a tape reader adapted to read a perforated tape, a mold disk having a plurality of molds therein, a drive pinion operative to rotate said mold disk to transfer any desired one of said molds from the slug casting position into a slug ejecting position in the normal cyclical operation of the machine, a cam shaft, drive mechanism for driving said pinion from said cam shaft, motor drive mechanism, mechanism for driving said pinion from said motor drive mechanism, means for effecting the transposition of the driving relation from said cam shaft drive mechanism to said motor drive mechanism, and an automatically releasable coupling interposed in said motor drive mechanism to permit displacement of said motor drive mechanism from said drive pinion.

6. The combination defined in claim 5 wherein means is provided operating in response to said tape reader for effecting the transposition from said cam shaft drive mechanism to said electric motor drive mechanism.

7. In a linecasting machine, a mold disc adjustable to a plurality of different positions, signal means for providing signals for movement of said mold disc to a desired position, a first means for registering a first signal from said signal means requesting a mold disc position change, a second means for registering a second signal from said signal means indicating the desired one of the positions, and adjustment means for operating the mold disc to different positions including a rotatable motor means for turning said mold disc to the different positions, circuit means for energizing said motor means, pin means for locating said mold disc with movement thereof to a position, and solenoid means for disengaging said pin means prior to energization of said motor means.

8. A linecasting machine as set forth in claim 7 in which said rotatable motor means comprises a rotary solenoid operable in each stroke to advance said mold disc to a different one of said positions, pulsing means controlled by said circuit means to advance said rotary solenoid one stroke in a cyclic manner, and means including said second means and said solenoid means for disabling said circuit means with advancement of said mold disc to the desired position.

9. In a linecasting machine, an adjustable mold disc movable to different positions input, means for providing a momentary signal indicating a desired position of the mold disc, a plurality of register circuits connected to said input circuit, each of which is connected to register a signal for a different position of the mold disc, latching means in each register circuit for maintaining said registration on the effective one of said register circuits after termination of said momentary signal, adjustment means for adjusting the mold disc to the position indicated by the signal on the effective one of said register circuits, start means for enabling said adjustment means, and means for enabling operation of said adjustment means by said start means only during the period a signal is registered on one of said register circuits.

10. In a linecasting machine for producing cast slugs, readout means for reading coded characters on an information-bearing means, matrix selecting and assembling mechanism, a first means connected to said readout means normally operative to effect the automatic operation of said matrix selecting and assembling mechanism in accordance with the information obtained by said readout means, command means including decoder means for decoding the information-bearing signals which are supplied thereto, means connected to said readout means responsive to the occurrence of a predetermined code on said information-bearing means to disable said first means, means for connecting the output of said readout means after said disablement of said first means to said decoder means, an adjustable mold disc operable to a plurality of different positions to select a correspondingly different mold for use, and control means connected to said decoder means for selectively positioning said mold disc to the one of the positions indicated by the signals from said decoder means.

11. In a linecasting machine for producing cast slugs, readout means for reading coded characters on an information-bearing means, matrix selecting and assembling mechanism, a first means connected to said readout means normally operative to effect the automatic operation of said matrix selecting and assembling mechanism in accordance with the information obtained by said readout means, command means including decoder means for decoding the information-bearing signals which are supplied thereto, means connected to said readout means responsive to the occurrence of a predetermined code on said information-bearing means to disable said first means, means connecting the output of said readout means after said disablement of said first means to said decoder means, saw means, means connected to said decoder means for controlling said saw means to cut a slug to the length indicated by the signals from said decoder means, an adjustable mold disc movable to each of a plurality of different positions to move a correspondingly different mold into a predetermined functional position for use in a casting operation, and means connected to said decoder means for selectively positioning said mold disc to the one of the positions indicated by the signals from said decoder means.

12. In a linecasting machine for producing cast slugs, readout means for reading coded characters on an information-bearing means, matrix selecting and assembling mechanism, a first means connected to said readout means normally operative to effect the automatic operation of said matrix selecting and assembling mechanism in accordance with the information obtained by said readout means, command means including decoder means for decoding the information-bearing signals, means connected to said readout means responsive to the occurrence of a predetermined code on said information-bearing means to disable said first means, means connecting the output of said readout means after said disablement of said first means to said decoder means, an adjustable knife, means connected to said decoder means for adjusting said knife to different positions indicated by signals from said decoder means, an adjustable mold disc movable to each of a plurality of different positions to move a correspondingly different mold into a predetermined functional position for use in a casting operation, and means connected to said decoder means for positioning said mold disc to different positions indicated by signals from said decoder means.

13. In a linecasting machine for producing cast slugs, readout means for reading coded characters on an information-bearing means, matrix selecting and assembling mechanism, a first means connected to said readout means normally operative to effect the automatic operation of said matrix selecting and assembling mechanism in accordance with the information obtained by said readout means, command means including decoder means for decoding the information-bearing signals, means connected to said readout means responsive to the occurrence of a predetermined code on said information-bearing means to disable said first means, means connecting the output of said readout means after said disablement of said first means to said decoder means, saw means, means connected to said decoder means for controlling said saw means to cut a slug to the length indicated by said command means, an adjustable knife, means connected to said decoder means for adjusting said knife to different positions indicated by signals from said command means, an adjustable mold disc movable to each of a plurality of positions to move a correspondingly different mold into a predetermined functional position for use in a casting cycle, and means connected to said decoder means for positioning said mold disc to different positions indicated by signals from said decoder means.

14. In a linecasting machine, the combination of a mold disk having a plurality of molds, one of which is in a functional position, an operating mechanism for rotating said mold disk, a first drive means for said operating mechanism operative to cyclically move said mold disk in the use of said one mold in a casting operation, a coded tape having a different code on said tape for each of the different molds, a tape reader adapted to read said perforated tape, control means connected to said tape reader, and a second drive means controlled by said control means to move said one mold out of the functional position and said other mold indicated by the code into said functional position for use in the next casting cycle.

15. In a linecasting machine, the combination of a mold disk having a plurality of molds, one of which is in a functional position, an operating mechanism for rotating said mold disk, a first drive means for said operating mechanism operative to effect movement of said mold disk and said one mold in a casting operation, a coded tape having a different code on said tape for each of the different molds, a tape reader adapted to read said perforated tape, control means connected to said tape reader, a second drive means controlled by said control means to move the one of the molds indicated by the code into the functional position for use in the cyclic operation, and means for disengaging said first drive means from said operating mechanism during the period that said second drive means is operative to effect movement of the indicated mold into the slug casting position.

16. A linecasting machine as set forth in claim 14 in which said first drive means includes a main drive shaft and a disconnect clutch for connecting the main drive shaft to said operating mechanism, and said second drive means includes a second drive shaft connected to said operating mechanism, motor means for said second drive shaft, and an overrunning clutch connecting said motor means to said second drive shaft.

17. In a linecasting machine having a mold disk adjustable to different positions to selectively position a correspondingly different size mold for use in casting slugs of different dimensions, adjustment means for selectively adjusting said mold disk to said different positions, signal source means for providing a plurality of sets of control signals including a first signal requesting a mold disk adjustment, and a second signal set indicating the mold disk position to be selected, first means connected to said signal source means to register the signals which indicate a request for a mold disk adjustment, second means connected to said signal source means including means enabled by said first means to register said second set of control signals which indicate the desired mold disk position, and control means connected to said second means for enabling said adjustment means in the movement of the mold disk to the position requested by said second signal set.

18. In a linecasting machine, a mold disk adjustable to different positions, tape means having coded signals, a tape reader adapted to read coded signals on said tape, decoder means connected to said tape reader for decoding the code signals provided by said tape reader, a first means connected to said decoder means for registering a first signal which requests a mold disk adjustment, a second means enabled by said first means to register a second signal from said decoder means which indicates the desired position, control means connected to said second means for effecting adjustment of the mold disk to the position registered on said second means, and enabling means for said control means responsive to readout of a third signal on said tape.

19. In a linecasting machine, a mold disk adjustable to a plurality of different positions, adjustment means for adjusting said mold disk to said different positions, tape means having different coded signals for representing different mold disk positions, a tape reader adapted to read coded signals on the tape, decoder means connected to said tape reader for decoding the coded signals, signal register means connected to said decoder means for registering a signal from said decoder means which indicates the desired position of said mold disk, circuit means connected to said signal register means for selectively controlling said adjustment means to move the mold disk to the registered position, and inhibit means operated by said circuit means in inhibit operation of said tape reader during the period of adjustment of said mold disk to a different position.

20. In a linecasting machine a mold disk adjustable to different positions to provide different molds for use in a casting operation, tape means having different code signals to represent different mold disk positions, a tape reader adapted to read coded signals on the tape, decoder means for decoding said coded signals, first means connected to said decoder means for registering the first signal from said decoder means which requests adjustment of the mold disk to a desired position, a second means enabled by said first means to register a second signal from said decoder means which indicates the desired position of the mold disk, control means connected to said second means including stepping means operatively controlled by said control means to step said mold disk through successive positions to the position registered on said second means, indicator means for indicating each position to which said mold disk is moved, and means controlled by said indicator means to reset said second means responsive to adjustment of said mold disk to the requested position.

21. In a linecasting machine including a mold disk having a plurality of molds, one of which is in a functional position, mold disk driving means, and a first operating mechanism for said mold disk drive means controlled to cyclically operate the functional mold in a casting operation, the improvement comprising a second operating mechanism for said mold disk drive means operative to rotate said mold disk to move different molds into the functional position, input means for providing a signal set indicating the mold to be selected for movement to said functional position, and control means connected to said input means for operating said second operating mechanism to move the mold indicated by said signal into said functional position.

22. A linecasting machine as set forth in claim 21 which includes a plurality of magazines, magazine adjustment means for adjusting said magazines to different conditions responsive to signals from said input means, and enabling means for preparing said control means for operation responsive to receipt of signals by said magazine adjustment means from said input means.

23. A linecasting machine as set forth in claim 21 which includes a knife block, knife block control means for effecting adjustment of said knife block to different positions responsive to signals from said input means, and means in said knife block control means for inhibiting operation of said control means for said mold disk during an adjusting operation by said knife block control means.

24. In a linecasting machine including a mold disk having a plurality of molds, one of which is in a functional position, mold disk drive means, and a first drive mechanism for said mold disk drive means operative to cyclically drive the functional mold in a casting operation, the improvement comprising a second operating mechanism for said mold disk drive means operative to move a selected one of said molds to the functional position, input means including a first input means for providing signals to select a mold for movement to said position, and a second input means for providing a start signal, control means responsive to said start signal including a first means for enabling said second operating mechanism to initiate rotation of said mold disk in response to said start signal, a second means for disabling said first operating mechanism relative to said mold disk drive, and a third means for inhibiting the supply of further signals by said input means during operation of said second operating mechanism, and means for disabling said first means to terminate operation of said second operating mechanism with movement of the desired mold to the functional position.

25. A linecasting machine as set forth in claim 24 which includes a plurality of magazines, and magazine control means for operating said magazines to different positions, and in which said input means includes means for providing signals representing the desired positions of said magazines, and means in said magazine control means for providing an enabling signal to the control means for said mold disk whenever an input signal is received indicating a magazine control is required.

26. A linecasting machine as set forth in claim 19 which includes means for controlling said circuit means to terminate operation of said adjustment means as the mold is moved to the indicated position, a plurality of magazines, magazine control means connected to said decoder means for effecting adjustment of said magazines to different positions in response to predetermined coded signals on said tape means, and means for providing a signal from said magazine control means to said circuit means to maintain operation of said inhibit means until an indicated magazine adjustment has been effected.

References Cited by the Examiner

UNITED STATES PATENTS

| | | | |
|---|---|---|---|
| 2,704,596 | 3/1955 | Ackell | 199—18 |
| 2,820,544 | 1/1958 | Hipman et al. | 199—47 |
| 2,846,055 | 8/1958 | Ackell | 199—18 |

ROBERT E. PULFREY, *Primary Examiner.*

W. F. McCARTHY, *Assistant Examiner.*

UNITED STATES PATENT OFFICE
CERTIFICATE OF CORRECTION

Patent No. 3,291,290 December 13, 1966

Frederick P. Netznik et al.

It is hereby certified that error appears in the above numbered patent requiring correction and that the said Letters Patent should read as corrected below.

Column 28, line 8, after "said" insert -- code --.

Signed and sealed this 26th day of September 1967.

(SEAL)
Attest:

ERNEST W. SWIDER
Attesting Officer

EDWARD J. BRENNER
Commissioner of Patents